United States Patent [19]
Berenguer et al.

[11] Patent Number: 5,964,899
[45] Date of Patent: Oct. 12, 1999

[54] AZO DYES, THEIR PRODUCTION AND USE

[75] Inventors: Jordi Berenguer, El Prat de Llobregat; Manuel Jose Domingo, Barcelona, both of Spain; Jose Rocas, Reutlingen, Germany

[73] Assignee: Clariant Finance (BVI) Limited, Tortola, Virgin Islands (Br.)

[21] Appl. No.: 08/947,182

[22] Filed: Oct. 8, 1997

Related U.S. Application Data

[63] Continuation of application No. 08/613,573, Mar. 11, 1996, abandoned.

[30] Foreign Application Priority Data

Mar. 10, 1995 [GB] United Kingdom .................... 9504870

[51] Int. Cl.$^6$ ................................. D06P 3/32; D06P 1/02; D06P 1/30
[52] U.S. Cl. .................. 8/436; 8/652; 8/639; 8/641; 8/662; 534/580; 534/581; 534/588; 534/752; 534/753; 534/756; 534/757; 534/809; 534/816; 534/838; 549/15
[58] Field of Search ................................. 8/436, 652, 662, 8/639, 641; 534/580, 581, 753, 756, 757, 809, 816, 838; 549/15, 24

[56] References Cited

U.S. PATENT DOCUMENTS

| | | |
|---|---|---|
| 1,724,108 | 8/1929 | Rath . |
| 1,724,109 | 8/1929 | Rath . |
| 1,758,865 | 5/1930 | Straub et al. . |
| 2,117,699 | 5/1938 | Burchill . |

FOREIGN PATENT DOCUMENTS

| | | |
|---|---|---|
| 573831 | 5/1944 | United Kingdom . |
| 2201165 | 8/1988 | United Kingdom . |
| 2228490 | 8/1990 | United Kingdom . |
| 2255981 | 11/1992 | United Kingdom . |
| 2273103 | 6/1994 | United Kingdom . |
| WO 93/07221 | 4/1993 | WIPO . |

OTHER PUBLICATIONS

Chem. Abstr. vol. 81, No. 26, Osman et al., 171322h, Dec. 30, 1974.
Rath and Wagner, "Palette", Pt. 1, 19–22, 1959.
Rath and Wagner, "Palette", Pt. II, 23–28, 1959.

*Primary Examiner*—Margaret Einsmann
*Attorney, Agent, or Firm*—Thomas C. Doyle

[57] ABSTRACT

Azo dyes containing sulphur dye entities as a constitutional component are dyes of valuable properties, in particular for the dyeing of leather.

41 Claims, No Drawings

AZO DYES, THEIR PRODUCTION AND USE

This a continuation division of application Ser. No. 08/613,573, filed Mar. 11, 1996 now abandoned.

It has been found that azo dyes comprising sulphur dye entities in their structure are dyes that on various substrates may display valuable properties, e.g. fastnesses and colours. As sulphur dye entity there is meant the radical of a sulphur dye or of a (pre)reduced sulphur dye, which may be further substituted, and being present in the azo dye as a constituent of the dye molecule.

The invention relates to the defined azo dyes, their production and use.

The invention thus provides an azo dye (Z) containing at least one azo group and at least one chromophoric radical, wherein at least one chromophoric radical comprises a radical of an optionally modified, optionally (pre)reduced sulphur dye (S) or a mixture thereof.

The dyes of the invention may be synthetized by reaction of diazonium compounds with other reactants capable of reacting with a diazonium compound, the reaction being, in particular, either a coupling reaction or the reaction with a thiolate or oxolate group to form a (thio)ether with cleavage of the nitrogen. Further reactions, e.g. for modifying the optionally (pre)reduced sulphur dye and/or for further modifying a synthetized azo dye may also take place.

As sulphur dyes come, in general, into consideration conventional dyes known under this concept and as defined as "Sulphur Dyes" and "Sulphurized Vat Dyes" in VENKATARAMAN "The Chemistry of Synthetic Dyes" Vol. II (Chapters XXXV and XXXVI) (1952) and Vol. VII (1974) or as defined e.g. in the "Colour Index" as "Sulphur Dyes" and also as "Vat Dyes" with the further indication "sulphur" and/or with a structure number and a synthetic method involving a sulphurization, e.g. as indicated in VENKATARAMAN as sulphurized vat dyes. Essentially they are dyes that contain aromatically bound oligosulphide bridges that are reducible to thiol groups and may optionally be of oligomeric to polymeric structure. They are obtainable mainly by thionation of the respective intermediates at high temperature, e.g. above 100° C., in particular in the temperature range of 110–300° C. (e.g. by baking or in the melt or in the presence of water and/or of an inert organic solvent).

Among the sulphurized vat dyes are in particular meant those with typical sulphur dye character, i.e. containing oligosulphide bridges and preferably not containing conjugated pairs of carbonyl groups.

A preferred kind of sulphurized vat dyes is represented by those of the carbazole-group-containing indophenol series.

The exact structure of sulphur dyes is mostly unknown or not completely known, even if the starting compounds are known, since e.g. the number and/or position of the oligosulphide bridges, the number of sulphur atoms in one oligosulphide bridge, the number of hetero-rings and/or of NH-bridges, of any hydroxy groups and/or of any primary amino groups and further also the number of repeating monomeric units and their arrangement in the sulphur dye molecule may vary depending on the starting materials and synthetic conditions.

According to the invention there may be used as a starting dye (S) any optionally modified, optionally (pre) reduced sulphur dye, suitable for the respective reaction; i.e. if (S) is used as a diazo component, it will contain at least one diazotisable amino group, in particular in the (pre) reduced form or, depending on the specific sulphur dye, also in the non-reduced form. If the dyes are obtained by reacting other diazonium compounds (Dz) with an optionally (pre) reduced sulphur dye (S), (S) will suitably contain at least one reactive group capable of reacting with (Dz), as will mostly be a thiolate or oxolate group of (S).

If desired (S) may be subjected to a purification treatment, e.g. by reducing and reoxidizing, if desired, with filtration and/or dialysis, e.g. as described in WO-A-93/07221 or in GB-A-2 228 490.

As (S) there may, in particular, be employed the (pre) reduced form of any sulphur dyes known to be reducible to the corresponding leuco sulphur dyes, e.g. of sulphur dyes known to lead to the following leuco sulphur dyes [Colour Index Leuco Sulphur denomination or Colour Index Reduced Vat (sulphur) denomination]:

C.I. Leuco Sulphur Black 1, CAS: 66241-11-0
C.I. Leuco Sulphur Black 2, CAS: 101357-26-0
C.I. Leuco Sulphur Black 11, CAS: 90480-94-7
C.I. Leuco Sulphur Black 18, CAS: 90170-71-1
C.I. Leuco Sulphur Red 10, CAS: 1326-96-1
C.I. Leuco Sulphur Red 14, CAS: 68585-53-5
C.I. Leuco Sulphur Blue 3, CAS: 85566-77-4
C.I. Leuco Sulphur Blue 7, CAS: 69900-21-6
C.I. Leuco Sulphur Blue 11, CAS: 90480-94-7
C.I. Leuco Sulphur Blue 13, CAS: 12262-26-9
C.I. Leuco Sulphur Blue 15, CAS: 100208-97-7
C.I. Leuco Sulphur Blue 20, CAS: 85940-25-6
C.I. Reduced Vat Blue 43, CAS: 1327-79-3
C.I. Leuco Sulphur Green 2, CAS: 12262-32-7
C.I. Leuco Sulphur Green 16, CAS: 70892-38-5
C.I. Leuco Sulphur Green 35, CAS: 90170-23-3
C.I. Leuco Sulphur Green 36, CAS: 90295-17-3
C.I. Leuco Sulphur Brown 1, CAS: 1326-37-0
C.I. Leuco Sulphur Brown 3, CAS: 100208-66-0
C.I. Leuco Sulphur Brown 10, CAS: 12262-27-0
C.I. Leuco Sulphur Brown 21, CAS: 97467-78-2
C.I. Leuco Sulphur Brown 26, CAS: 71838-68-1
C.I. Leuco Sulphur Brown 31, CAS: 1327-11-3
C.I. Leuco Sulphur Brown 37, CAS: 70892-34-1
C.I. Leuco Sulphur Brown 52, CAS: 68511-02-4
C.I. Leuco Sulphur Brown 95, CAS: 90268-97-6
C.I. Leuco Sulphur Brown 96, CAS: 85736-99-8
C.I. Leuco Sulphur Orange 1, CAS: 1326-49-b 4
C.I. Leuco Sulphur Yellow 9, CAS: 85737-01-5
C.I. Leuco Sulphur Yellow 22, CAS: 90268-98-7, or also the corresponding non-reduced or non-leuco dyes.

For the purpose of the invention it is of particular advantage that the dye (S), in particular in the (pre)-reduced form, be substantially free of disturbing sulphide. Such (pre) reduced forms of sulphur dyes with a very low inorganic sulphide content or that are substantially free of a disturbing amount of inorganic sulphide are known in the art e.g. from the published patent applications GB-A-2 201 165 (liquid formulations of reduced sulphur dyes) and GB-A-2 255 981 and 2 273 103 (dry reduced sulphur dyes).

Where the starting dye is in non-reduced form or partially reduced (pre-reduced) form, it may be employed in the form of available commercial dyes or directly as obtained from the thionation synthesis, e.g. by baking or boiling or in the melt, or also as obtained by re-oxidation of a reduced form, e.g. in the form of the thionation mixture from the synthesis of the dye, or also in the form of a dry dye or slurry, as described e.g. in WO-A-93/07221 or in GB-A-2 228 490. The thionation mixture may e.g. be precipitated from its aqueous alkaline mixture in conventional way, e.g. by oxidation or acidification, and filtered and the filter cake may be taken up in concentrated NaOH solution. The obtained. solution may then (directly or upon previous reduction) be reacted with (Dz) or—upon diazotization—coupled to a coupling component (B), and optionally reacted with other reactants.

Where it is desired to purify the starting dye (S) from any disturbing sulphide or sulphur, this may e.g. be accomplished by oxidizing until the disturbing sulphur or/and sulphide is oxidized in the presence of NaOH to a water soluble sodium salt form, mainly sodium sulphate; the non-soluble oxidized form of the dye may be separated from the inorganic dissolved salts by filtration, and then, if desired, be re-reduced to a (pre)reduced form.

The azo dyes (Z) of the invention [i.e. an azo dye (Z) or a mixture thereof] may be produced by reaction of at least one azo group-containing diazonium compound (Dz) [i.e. a diazonium compound that, besides the diazotized amino group contains at least one azo group] with at least one dye (S) or/and by coupling of the diazonium compound of at least one diazotizable dye (S) to at least one coupling component (B) [optionally over at least one middle component (Mk)] and optionally further modification reactions, in particular with at least one further reactant (E).

More particularly the process for the production of the azo dyes (Z) or mixtures thereof according to the invention is characterized in that a) the diazonium compound of at least one optionally modified, optionally (pre)reduced sulphur dye ($S_1$) is coupled—optionally over at least one middle component (Mk)—to at least one coupling component (B) and the product is optionally further modified, or b) at least one azo-group-containing diazonium compound (Dz) is reacted with at least one optionally modified, optionally (pre)reduced sulphur dye ($S_2$) and the obtained product is optionally further modified.

If the starting dye (S) [in particular ($S_1$) or ($S_2$)] is in non-reduced form a reducing carbonyl compound —in particular containing an activating substituent such as hydroxy or methoxy in α-position, e.g. a reducing sugar or hydroxyacetone—may be added in the presence of sodium hydroxide in concomitance with (Dz) or (B) respectively (Mk) and optionally (E), e.g. directly before, at least in part simultaneously with or in a stepwise reaction sequence with one or more reactants (Dz) or (B) or/and (Mk) and optionally (E).

The starting optionally (pre)reduced sulphur dyes (S) may be represented by the following general formula $$D-(XH)_y, \quad (I)$$

in which X signifies —O—, —S— or —NH—,

D is the y-valent radical of the dye (S) and y signifies a figure from 1 to the maximum functionality of the optionally (pre)reduced sulphur dye of formula (I), expressed by the formula

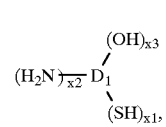

$$(I')$$

wherein each of x1, x2 and x3 is a figure $\geq 0$, with the proviso that the sum (x1+x2+x3) is a figure in the range from 1 to the total of the —OH, —SH and —NH$_2$ groups in the optionally (pre)reduced sulphur dye, i.e. y is a figure in the range of 1 to (x1+x2+x3), and which are shown in the above formula in the free acid form but are preferably employed in the alkali metal salt form.

Depending on the method of production of the dye (S), some of the x1 groups —SH or —S$^-$ may also be linked to D, over a bridge of one or more (e.g. 1 to 6) sulphur atoms.

It is also possible to employ Bunte salts, i.e. compounds of formula (I') in which, where x1 $\geq 1$, at least some of the x1 groups —SH are replaced by a group —S—SO$_3$H, resp. a salt thereof.

If x1 is 0, formula (I') represents the non-reduced form of a sulphur dye that contains a sufficient amount of amino and optionally hydroxy groups as is sufficient for the dye to be soluble in weakly acidic to weakly alkaline aqueous solution, in particular of a pH in the range of 4 to 8. In this case the sum (x2+x3) is preferably at least 2, more preferably x2$\geq$2, e.g. x2+x3$\geq$4.

If x1$\geq$1 formula (I') represents a (pre)reduced sulphur dye, that is soluble in aqueous concentrated sodium hydroxide, in particular in a 0.01N to 10N sodium hydroxide solution, preferably in a 0.1N to 8N sodium hydroxide solution. The sum (x1+x2) is, in this case, preferably $\geq 3$, more preferably $\geq 4$.

Preferably formula (I) respectively (I') represents a (pre) reduced sulphur dye in which x1 is at least 1, e.g. a number in the range of from 1 up to 1.5 times the number of benzenic rings in the molecule, preferably in the range of from 2 up to 1.3 times the number of benzenic rings in the molecule.

Depending on the degree of reduction of the sulphur dye to a (pre)reduced leuco form, this may be in a mono- or oligomeric form, preferably in an oligomeric form, i.e. a form containing two or more of the radicals derived from the original aromatic starting material.

By way of example there may be mentioned a leuco form of C.I. Sulphur Black 1 that contains four benzenic rings and, depending on its synthetic method and degree of reduction, may contain 2 to 6 thiol groups, and a leuco form of C.I. Sulphur Brown 10 that contains 4 to 8 benzenic rings and, depending on its synthetic method and degree of reduction, may contain 1 to 9 thiol groups.

Taking as a reference one of the formulae indicated in volume 2 of VENKATARAMAN (cited above), i.e. the one indicated at page 1090 as formula IV, which contains four benzenic rings derived from the reduced form of the original sodium dinitrophenate, the reduced form of C.I. Sulphur Black 1 derived therefrom will contain four thiol groups, two primary amino groups, four secondary amino groups and two hydroxy groups as corresponding to the following formula

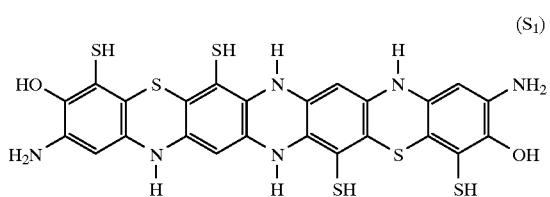

(S₁)

in which in the presence of sodium hydroxide the thiol groups will be in sodium thiolate form.

Analogously the reduced fully thiolated form of C.I. Sulphur Brown 10 or C.I. Sulphur Orange 1 corresponding to the oligomeric derivative of 2,4-diaminotoluene, may be represented by the presumed general oligomeric formula

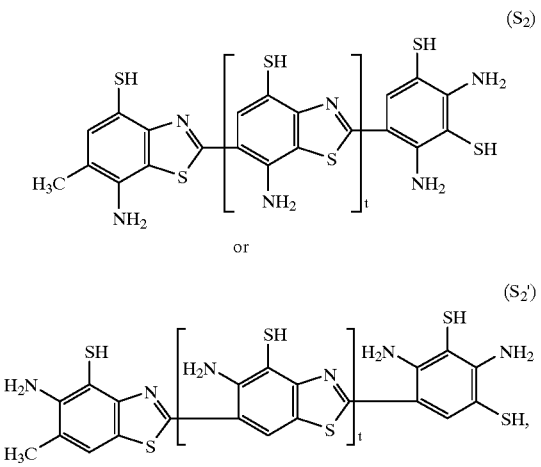

(S₂)

or (S₂')

wherein t signifies e.g. 2 to 6 (mostly 4 to 6) and in which, in the presence of sodium hydroxide, the thiol group will be in sodium thiolate form.

If desired, the starting sulphur dyes (S) may have been chemically modified by introducing into the molecule one or more substituents, provided that at least one, preferably at least two of the substituents required for the reaction with (B) or (Mk) or (Dz) will not have been engaged in other reactions. Thus, if (S) will be a diazo component (S₁) at least one, preferably at least two primary amino groups of (S) will be available for diazotizing. Thus, if (S) is used as a diazo component, i.e. as (S₁), at least a part of any available thiol and/or hydroxy groups of (S₁) may have been reacted with a reactant (E), e.g. by alkylation and/or arylation in order to modify the properties of (S₁), e.g. its anionicity, its cationicity and/or its hydrophilicity. Preferably, if (S,) is modified, the modifying substituents are hydrophilizing substituents, in particular containing a hydrophilizing sulpho group or carboxy group or amide group or also two or more thereof.

If (S) is used as a component for the reaction with (Dz) i.e. as (S), (S.) will contain at least one substituent, preferably at least two substituents capable of reacting with a diazonium compound in order to form a (thio)ether bridge with cleavage of the nitrogen of the diazonium group. Such reactive groups are, in particular, thiolate groups and optionally oxolate groups as deriving from aromatically linked thiol groups or hydroxy groups which under strongly alkaline conditions are in the corresponding salt form, e.g. in the presence of sodium hydroxide at a pH of above 12 (e.g. pH 14) as sodium thiolate or as sodium oxolate respectively. In this case, if desired, an amino group of (S) and/or a part of the available thiol groups and/or optionally hydroxy groups of (S₂) may be modified, e.g. alkylated and/or arylated, analogously as described above for (S₁), with reactants (E), in particular providing substituents that may be anionic, cationic or non-ionic, preferably especially where (S₂) is in non-reduced form or only pre-reduced form—so as to improve its hydrosolubility by introduction of a solubilizing substituent, such as sulpho groups, carboxy groups or amide groups (preferably carbamoyl or sulphamoyl).

The diazotization of (S₁) may take place by pre-mixing an alkaline solution of (S₁), preferably of a pH ≧10, more preferably ≧12 and at a temperature between −10° C. and +15° C. and pouring this mixture into ice-cooled hydrochloric acid, so that the reaction temperature will be preferably below 10° C., more preferably between −5° C. and +10° C. The obtained solution of the diazotized (S₁), which will be a true or colloidal solution, may then be reacted analogously to any conventional diazo compound with any coupling component (B) under temperature and reaction conditions as suitable for the respective coupling with (B), e.g. at temperatures in the range of 0 to 40° C. and at pH values in the range of pH 3 to pH 11.

For the reaction of (S₂) with (Dz) (S₂) is preferably employed in the form of an alkaline solution at pH values at which (S₂) will be dissolved, preferably at pH values above pH 10, more preferably above pH 12. The temperature for the reaction with (Dz) is preferably in the range of −10° C. to +40° C., more preferably between −10° C. and +20° C. as suitable for controlling the N₂-development, as desired and suitable for the employed reaction assembly.

As (Dz) there may be employed any diazonium compound that may contain one or more azo groups and as can be produced by diazotization and coupling reactions employing known diazo components (A), known middle components (Mk), known bis-diazo components (Aa), and optionally known coupling components (B₁), known bis-coupling components (Bb) and optionally metal complexes of metallizable azo dyes resulting therefrom. As (Dz) there may also be employed diazotized (S₁).

The mentioned components may be combined in any suitable sequence so as to result in a component (Dz) containing at least one azo group, preferably one to three azo groups, and furthermore a diazonium group suitable for the reaction with (S₂). Such components (Dz) may, in particular, be the products of:

1. coupling the diazo compound of a diazo component (A) to one middle component (Mk) or sequentially to more middle components (Mk) and finally diazotizing the terminal amino group;

2. coupling the diazo compound of a diazo component (A), optionally over at least one middle component (Mk), to a bis-coupling component (Bb) and then coupling selectively one diazonium group of a bis-diazotized bis-diazo component (Aa) thereto; alternatively there may be employed as (Aa) a component containing one diazotizable amino group and one substituent that can be converted afterwards to an amino group, e.g. a nitro group that can be reduced to primary amino, or a protected primary amino group, e.g. an acylated, in particular acetylated amino group that can be hydrolyzed to primary amino, which, after the coupling of the first diazotized amino group are then converted to primary amino, which is then diazotized for the reaction with (S₂);

or 3. coupling a diazotized bis-diazo component (Aa) (preferably of the last mentioned kind) at one side to a coupling component (B), optionally over at least one middle component (Mk), converting any protected amino group or nitro group to primary amino which is diazotized and the diazonium compound may directly be employed for reacting with (S$_2$) or is first coupled to a middle component (Mk) or sequentially to more middle components (Mk), the terminal amino group of which is then diazotized for reaction with (S$_2$).

As diazo components (A) there may be employed any known diazotizable amines, in particular of the benzene or naphthalene series, preferably containing at least one solubilizing substituent, which preferably is a sulpho group, a carboxy group, a carbamoyl group and/or a sulphamoyl group. As diazo components (A) come in particular into consideration those of the following formulae

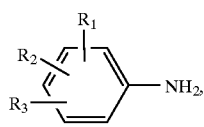 (a$_1$)

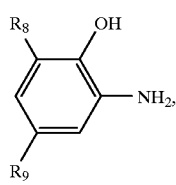 (a$_2$)

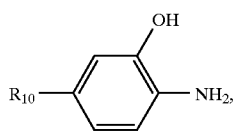 (a$_3$)

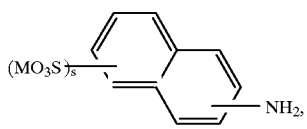 (a$_4$)

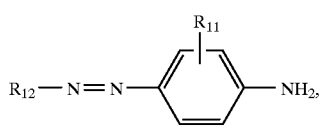 (a$_5$)

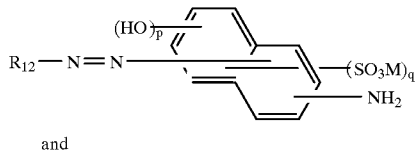 (a$_6$)

and

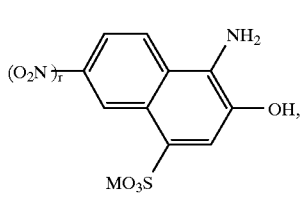 (a$_7$)

wherein

R$_1$ signifies hydrogen, nitril, trifluoromethyl, nitro, —SO$_3$M, —SO$_2$NR$_4$R$_5$, —COOM or —CONR$_4$R$_5$, R$_2$ signifies hydrogen, nitro, —SO$_3$M, —SO$_2$NR$_4$R$_5$, trifluoromethyl, nitril, —COOM, —CONR$_4$R$_5$, C$_{1-4}$-alkyl, C$_{1-4}$-alkoxy, halogen or C$_{1-2}$-mercaptoalkyl, R$_3$ signifies hydrogen, C$_{1-4}$-alkyl, C$_{1-4}$-alkoxy, halogen, C$_{1-2}$-mercaptoalkyl, —NH—Ac, —NH—CO—O—CH$_3$ or a radical of formula

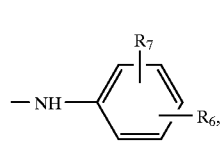 (a')

R$_4$ signifies hydrogen, C$_{1-4}$-alkyl, C$_{1-3}$-alkylene-R' or C$_{2-3}$-hydroxyalkyl, R$_5$ signifies hydrogen, C$_{1-4}$-alkyl, C$_{1-3}$-alkylene-R', C$_{2-3}$-hydroxyalkyl, benzyl or a radical of formula

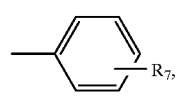 (a")

R' signifies nitril, carbamoyl or —COOM,

R$_6$ signifies hydrogen, nitro or —SO$_3$M,

R$_7$ signifies hydrogen, methyl, chlorine, nitro, —COOM or —SO$_3$M,

R$_8$ signifies hydrogen, halogen, nitro, —SO$_3$M, —SO$_2$NR$_4$R$_5$, methylsulphonyl, C$_{1-4}$-alkyl or —NH—Ac, R$_9$ signifies hydrogen, halogen, nitro, —SO$_3$M, —SO$_2$NR$_4$R$_5$, methylsulphonyl, C$_{1-4}$-alkyl or —NH—Ac, R$_{10}$ signifies nitro, —SO$_3$M or —SO$_2$NR$_4$R$_5$, R$_{11}$ signifies hydrogen, C$_{1-4}$-alkyl, C$_{1-4}$-alkoxy, hydroxy, —NH$_2$ or —NH—Ac, R$_{12}$ signifies the radical of a diazocomponent deriving from the diazotization of an amine of formula (a$_1$), (a$_2$), (a$_3$), (a$_4$) or (a$_7$), Ac signifies an aliphatic acyl group, p signifies 0 or 1, q signifies 0, 1 or 2, r signifies 0 or 1 and s signifies 0 or 1.

As bisdiazocomponents (Aa) are suitable, in particular amines of formula (a$_1$), (a$_2$), (a$_3$) or (a$_7$) containing a nitro group, or of formula (a$_1$), (a$_2$), (a$_5$) or (a$_7$) containing a group —NH—Ac.

R$_1$ preferably signifies hydrogen or —COOM.

Of the alkyl and alkoxy groups with 1 to 4 carbon atoms, the lower molecular ones are preferred, in particular ethyl, methyl, ethoxy and methoxy. Halogen may in particular be fluorine, chlorine or bromine of which fluorine and, before all, chlorine are preferred.

Where in formula (a$_1$) R$_3$ signifies a radical of formula (a') this is preferably in para-position to the amino group, R$_1$ preferably signifies hydrogen, R$_2$ preferably signifies hydrogen or a sulpho group and, if R$_2$ signifies a sulpho group, this is preferably in meta-position to the azo group and R$_6$ and R$_7$ preferably signify both hydrogen or, if R$_2$ signifies hydrogen, R$_6$ signifies preferably a nitro group and R$_7$ signifies preferably a carboxy group or a sulpho group, the two substituents $R_6$ and $R_7$ being placed in the para-position to the imino group and in one of the two ortho-positions to the imino group.

Where the symbol $R_3$ does not signify a radical (a'), $R_3$ preferably signifies hydrogen and $R_1$ preferably signifies hydrogen or —COOM. According to a preferred feature, in this case in formula ($a_1$) one or both of the positions ortho to the primary amino group and, more preferably, also one or both of the positions meta to the primary amino group are unsubstituted. According to a further preferred feature, if $R_1$ signifies —COOM, this is in position ortho to the diazotizable primary amino group.

$R_4$ preferably signifies hydrogen.

$R_5$ advantageously signifies hydrogen, methyl, ethyl, hydroxyethyl or a radical of formula (a"), in which $R_7$ preferably signifies hydrogen or carboxy.

The aliphatic acyl group Ac advantageously signifies the radical of a low molecular aliphatic carboxylic acid, preferably of an alkanoic acid with 2 to 4 carbon atoms, more preferably acetyl or propionyl, of which acetyl is preferred.

In formula ($a_2$) preferably at least one of $R_8$ and $R_9$ has a significance other than hydrogen, more preferably $R_9$ has a significance other than hydrogen and $R_8$ signifies hydrogen, a nitro group or a sulpho group.

The primary amino group in formula ($a_4$) may be in any of the positions α and β of the naphthalene ring and, if s signifies 1, the sulpho group may be in any of the other available positions, preferably so that at least one vicinal position to the amino group is unsubstituted; e.g. if the amino group is in position 1, the sulpho group is preferably in any of the positions 3 to 8, more preferably 4 to 8, and if the amino group is in the position 2, the sulpho group is e.g. in position 1 or in any of the positions 4 to 8, more preferably 5, 6 or 7.

If in formula ($a_5$) $R_{11}$ signifies —OH, —$NH_2$ or —NHAc it is preferably in position meta to the group —$NH_2$; preferably the symbol $R_{11}$ signifies hydrogen.

In the significance of $R_{12}$ are preferred the diazo components of the benzene series, in particular those of formula ($a_1$), ($a_2$) and ($a_3$).

In formula ($a_6$) the primary amino group may be in any of the positions α and β of the naphthalene nucleus; if q is 1 or 2, the respective sulpho groups may be in any of the available other positions. If p=0, q preferably signifies 1 and the respective sulpho group is preferably in one of the positions 4 to 8, with respect to the primary amino group being in one of the positions 1 and 2. If p=0 more preferably the amino group is in position 1 and the azo group in position 4, any q sulpho groups preferably being in any of the positions 5 to 8. If p=1 the hydroxy group and the amino group are preferably in the positions 1,8 and q is preferably 1 or 2, the q sulpho groups being more preferably located in q of the positions 3 to 6; the group $R_{12}$—N=N— is preferably in a position ortho or para to the hydroxy group. Also in formula ($a_6$) $R_{12}$ is preferably the radical of a diazo component of the benzene series, in particular of formula ($a_1$), ($a_2$) or ($a_3$).

The compounds ($a_7$) are indicated in the free amine form, as diazo components they are however usually employed directly in the form of the respective commercially available diazonium compounds 1-diazonium-2-naphthol-4-sulphonic acid (in which r=0) and 1-diazonium-6-nitro-2-naphthol4-sulphonic acid (in which r=1).

Preferably (Dz) contains at least one hydrophilic substituent, preferably a substituent selected from the group consisting of —$SO_3M$, —$SO_2NR_4R_5$, —COOM and —$CONR_4R_5$, more preferably not more than one hydrophilic substituent per homocyclic aromatic nucleus.

The coupling components (B) may be the radicals of any coupling components H—B which may, in particular, be of the benzene, naphthalene, heterocyclic or open-chain methylene-active series, and suitably contains at least one substituent that activates the compound H—B for coupling, in particular an aromatically bound or enolic, optionally etherified hydroxy group or an optionally substituted amino group, so that the coupling reaction may take place in the corresponding activated position of the molecule H—B.

Suitable coupling components H—B are, in particular, those of the following formulae

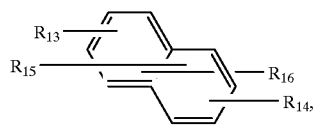

($b_1$)

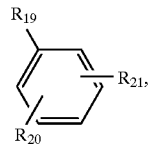

($b_2$)

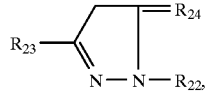

($b_3$)

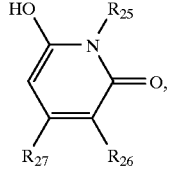

($b_4$)

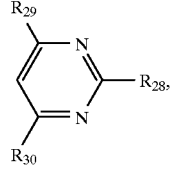

($b_5$)

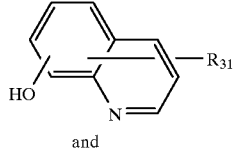

and ($b_6$)

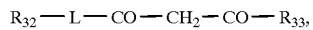

($b_7$)

wherein
$R_{13}$ signifies hydrogen, —$OR_{17}$ or —$NHR_{17}$,
$R_{14}$ signifies —$OR_{17}$ or —$NHR_{17}$,
$R_{15}$ signifies hydrogen, —$SO_3M$, —$SO_2NR_4R_5$, —COOM or —$CONR_4R_5$,
$R_{16}$ signifies hydrogen, —$SO_3M$, —$SO_2NR_4R_5$, —COOM or —$CONR_4R_5$,
$R_{17}$ signifies hydrogen, $C_{1-4}$-alkyl, Ac' or a radical of formula

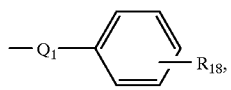

(b')

Ac' signifies the acyl radical of an aliphatic carboxylic acid, $Q_1$ signifies —CO—, —$SO_2$— or the direct bond, $R_{18}$ signifies hydrogen, methyl, —NH—Ac, —COOM or —$NO_2$ or, if in formula (b') $Q_1$ signifies —CO— or —$SO_2$—, also —$NH_2$, $R_{19}$ signifies —OH or —$NH_2$, $R_{20}$ signifies hydrogen, $C_{1-4}$-alkyl, $C_{1-4}$-alkoxy, —OH, —NR"R''' or —NH—Ac, $R_{21}$ signifies hydrogen, $C_{1-4}$-alkyl or $C_{1-4}$-alkoxy, R" and R''', independently, signify hydrogen, $C_{1-2}$-alkyl or $C_{2-3}$-hydroxy-alkyl, $R_{22}$ signifies hydrogen, sulphonaphthyl or a radical of formula

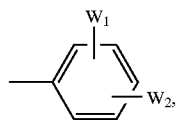

(b")

$W_1$ signifies hydrogen, halogen, methyl, methoxy or —COOM, $W_2$ signifies hydrogen, halogen, trifluoromethyl, nitril, nitro, —COOM, —$SO_3$M or —$SO_2NR_4R_5$, $R_{23}$ signifies $C_{1-4}$-alkyl, phenyl, —COOM, —$CONR_4R_5$, —$COOCH_3$ or —$COOC_2H_5$, $R_{24}$ signifies =O or =NH, $R_{25}$ signifies hydrogen, unsubstituted amino, phenylamino, sulphonaphthyl, open-chain $C_{1-8}$-alkyl, $C_{6-9}$-cycloalkyl, carboxy-($C_{1-4}$-alkyl), $C_{2-4}$-alkyl substituted with hydroxy, methoxy, ethoxy or a sulpho group in one of the positions β to ω or a radical of formula (b")

$R_{26}$ signifies hydrogen, nitril, acetyl, —COOM, carbamoyl, —$SO_3$M, pyridinio or 2-methyl-pyridinio, $R_{27}$ signifies hydrogen, hydroxy, methyl, carboxy, phenyl, sulphomethyl or carbamoyl, $R_{28}$ signifies hydroxy, primary amino, nitrilamino, thiol or a radical of formula

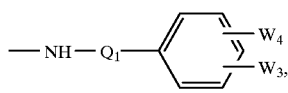

(b''')

$R_{29}$ signifies hydroxy or primary amino, $R_{30}$ signifies hydroxy or primary amino, $R_{31}$ signifies hydrogen, methyl, chlorine, chloromethyl or chloroacetyl, L signifies —O—, —NH— or the direct bond, $R_{32}$ signifies naphthyl, sulphonaphthyl, disulphonaphthyl or a radical of formula (b"), $R_{33}$ signifies $C_{1-4}$-alkyl, $W_3$ signifies hydrogen, hydroxy, $C_{1-4}$-alkoxy, —NHAc, —$NH_2$, di-($C_{1-4}$-alkyl)-amino or carboxymethylamino and $W_4$ signifies hydrogen or methyl, and, where in formula ($b_4$) R26 stands for pyridinio or orthomethylpyridinio, any carboxy or sulpho group present in the molecule may be in the form of the anion —$SO_3^-$ or —$COO^-$ to form the counterion in the form of the inner salt.

The aliphatic acyl radical Ac' in the significance of $R_{17}$ may be the radical of any aliphatic carboxylic acid as can be introduced by acylation, in particular of a $C_{2-12}$-alkanoic primary monocarboxylic acid, preferably such as stated above for Ac, especially $C_{2-4}$-alkanoyl, most preferably acetyl.

If $R_{18}$ signifies —COOM, $Q_1$ in formula (b') signifies in particular —CO—. If in formula (b') Q signifies the direct bond, $R_{18}$ preferably signifies hydrogen. If in formula (b') $Q_1$ signifies —$SO_2$-, $R_{18}$ preferably signifies methyl, acetylamino or —$NH_2$. If in formula (b') $Q_1$ signifies —CO—, $R_{18}$ preferably signifies hydrogen or —$NO_2$.

In formula ($b_1$) —$OR_{17}$ preferably signifies hydroxy and —$NHR_{17}$ preferably signifies —$NHR_{17}$', where $R_{17}$' signifies hydrogen, methyl, acetyl or a radical of formula (b'). Preferably $R_{14}$ signifies hydroxy or —$NHR_{17}$' and $R_{13}$ signifies hydrogen or, where $R_{14}$ signifies —OH, also a group —$NHR_{17}$'. More preferably either $R_{14}$ signifies hydroxy and $R_{13}$ signifies hydrogen or —$NHR_{17}$' or $R_{14}$ signifies —$NHR_{17}$' and $R_{13}$ signifies hydrogen. $R_{15}$ preferably signifies hydrogen, —$SO_3$M, —COOM or —$CONH_2$. $R_{16}$ preferably signifies hydrogen or —$SO_3$M, more preferably hydrogen.

If in formula ($b_2$) $R_{20}$ signifies hydroxy, —NR"R''' or —NH—Ac, it is preferably in meta-position to $R_{19}$ and $R_{21}$ preferably signifies hydrogen. If $R_{20}$ signifies $C_{1-4}$-alkyl or $C_{1-4}$-alkoxy it may be in any of the available positions ortho, meta and para to $R_{19}$. More preferably $R_{19}$ signifies hydroxy. Advantageously $R_{21}$ signifies hydrogen.

Of the alkyl and alkoxy radicals with 1 to 4 carbon atoms, also in (B) the lower molecular ones are preferred [analogously as in (A)], more specifically ethyl, methyl, ethoxy and methoxy. In the $C_{2-3}$-hydroxyalkyl radicals the hydroxy group is preferably in β-position.

In formula ($b_3$) $R_{22}$ preferably signifies a radical of formula (b"). In formula (b")—in the significance of $R_{22}$— preferably at least one of $W_1$ and $W_2$ signifies hydrogen, more preferably $W_1$. $R_{23}$ preferably signifies $C_{1-4}$-alkyl, more preferably methyl. $R_{24}$ preferably signifies oxygen.

The open-chain $C_{3-8}$-alkyl radicals in the significance of $R_{25}$ may be linear or branched, if they contain 6 to 8 carbon atoms they are preferably branched; the cycloalkyl radicals in the significance of $R_{25}$ are preferably cyclohexyl, which may be substituted with 1 to 3 methyl groups, more preferably it is unsubstituted cyclohexyl. The carboxy-substituted $C_{1-4}$-alkyl group preferably is carboxymethyl or β-carboxyethyl. The substituent (hydroxy, methoxy, ethoxy, sulpho) at the $C_{2-4}$-alkyl, in the significance of $R_{25}$, is preferably in β-position. If $R_{25}$ signifies a radical of formula (b") $W_1$ preferably signifies hydrogen and $W_2$ preferably signifies carboxy, sulpho or trifluoromethyl. Preferred significances of $R_{25}$ are hydrogen, a radical of formula (b"), $C_{1-8}$-alkyl, $C_{2-3}$-hydroxyalkyl and $C_{6-9}$-cycloalkyl.

$R_{26}$ preferably signifies hydrogen, a sulpho group or one of the stated nitrogen-containing substituents.

$R_{27}$ preferably has a significance other than hydrogen, more preferably methyl.

In formula ($b_5$) preferably at least one of $R_{29}$ and $R_{30}$ signifies hydroxy, more preferably both $R_{29}$ and $R_{30}$ signify hydroxy groups.

If in formula (b$_5$) R$_{28}$ signifies a radical of formula (b'''), —NH—Q$_1$— preferably signifies a group —NH—SO$_2$—.

In formula (b$_6$) the hydroxy group preferably is in position 8. If R$_{31}$ is other than hydrogen it is preferably in position para to the 8-positioned hydroxy group. R$_{31}$ preferably signifies hydrogen or methyl, more preferably hydrogen.

In formula (b$_7$) L preferably signifies —NH—. More preferably R$_{32}$ is unsubstituted phenyl and R$_{33}$ is preferably methyl.

The coupling component radical (B) preferably contains up to three cycles (homocyclic rings, heterocyclic rings and optionally a cycloaliphatic ring—a naphthalene radical being calculated as two cycles), more preferably B contains one or two of such cycles.

As bis-diazo components (Aa) come, in particular, into consideration those of the formula

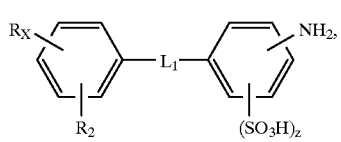 (Aa$_1$)

wherein

L$_1$ signifies a heteroatomic bridging member, in particular —SO$_2$—, —CO—, —SO$_2$—NH—, —CO—NH—, —NH—CO—NH—, —S—, —O—, —NH— or a methylene bridge, R$_x$ signifies primary amino, acetylamino or nitro and z signifies 0 or 1.

Suitable bis-coupling components (Bb) are, in particular, aminonaphtholes containing one or two sulpho groups, resorcine, metaaminophenol and metaphenylenediamine, e.g. as corresponding to the above formulae (b$_1$) or (b$_2$).

Suitable middle components (Mk) are aminonaphthalenes and aminonaphtholes, optionally containing one or two sulpho groups, e.g. of formula (b$_1$) and bicyclic compounds of the formula (mk$_1$)

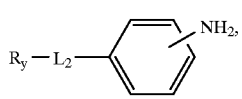 (mk$_1$)

in which L$_2$ is a group —Q$_1$—L—, preferably —SO$_2$—NH—, and

R$_y$ is a homocyclic or heterocyclic radical capable of a coupling reaction, e.g. a radical of the pyrazolone or pyrimidone series, e.g. as corresponding to the above formulae (b$_3$) or (b$_5$).

As (E) come into consideration any reactants suitable for reacting with —XH or —X$^-$ respectively and/or with a reaction product of (S) with (Dz), (B) or (Mk), in particular (E$_1$) reactants providing substituents that do not contain any azo groups, and where these substituents may be of any ionicity, in particular of anionic, cationic or non-ionic character, and (E$_2$) reactants suitable for further modifying an intermediate synthetized azodye (Z), e.g. complex-forming metal compounds, reducing or oxidizing agents or further modifying agents other than (E$_1$).

Suitable compounds (E$_1$) are preferably selected from:

(E$_{11}$) reactants providing anionic substituents, (E$_{12}$) reactants providing non-ionic substituents and (E$_{13}$) reactants providing basic or cationic substituents.

Suitable reactants (E$_{11}$) include e.g. compounds of formula

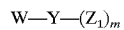 (II), in which

W signifies a reactive substituent, e.g. halogen or, if Y is aromatic also a diazonium group, Y signifies a bridging member, Z$_1$ signifies —COOM or —SO$_3$M, m signifies the number of substituents Z$_1$ linked to each group Y and is at least 1, preferably 1 or 2, and M signifies hydrogen or an alkali metal cation, or functional derivatives thereof, e.g. esters, halides, sultones, lactones or anhydrides, or a combination of a low molecular aliphatic aldehyde and alkali metal sulphite or bisulphite or SO$_2$ in the presence of alkali metal hydroxide, or ethylenically unsaturated carboxylic or sulphonic acids or their salts.

As esters there may be mentioned methyl or ethyl esters, as halides especially the chlorides, as lactones e.g. aliphatic C$_{4-6}$-lactones as sultones in particular butane-1,3- and -1,4-sultones. As low molecular aldehydes there may be mentioned acetaldehyde and preferably formaldehyde.

Y signifies an aromatic, araliphatic or aliphatic bridging group, in particular a hydrocarbon group that may optionally contain one or more heteroatoms and/or may be substituted. Where Z$_1$ signifies —COOM, —Y— preferably is aliphatic and advantageously contains 1 to 9, preferably 1 to 6 carbon atoms.

Where Z$_1$ signifies —SO$_3$M, (Z$_1$)$_m$—Y— may e.g. advantageously signify an optionally further substituted sulphobenzyl, mono- or disulphophenyl, mono- or disulphonaphthyl, a low-molecular sulphoalkyl or a 3-sulpho-2-hydroxypropyl-1. If —Y— is aliphatic and contains 3 or more carbon atoms, it may optionally be branched. If —Y— is aliphatic and contains 6 to 9 carbon atoms, it may optionally be cyclic. If —Y— is aliphatic, the substituents W and Z$_1$ are preferably at a distance of at least 2 carbon atoms from each other, if Z$_1$ is a sulpho group they are more preferably at a distance of at least 3 carbon atoms. If —Y— is substituted, it contains a substituent that preferably does not interfere with the reaction, e.g. low-molecular alkyl (preferably methyl), an aliphatically bonded secondary hydroxygroup or a methoxygroup. Where —Y— is aliphatic it is most preferably methylene or ethylene-1,2, if Z$_1$ is carboxy, or 2-hydroxypropylene-1,3, if Z$_1$ is sulpho.

Preferred compounds (E$_{11}$) are in particular: halides of formula

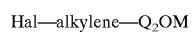 (e$_1$)

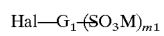 (e$_2$)

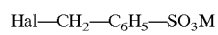 (e$_3$)

 (e$_4$).

cyclic esters (lactones or sultones) of formula $$\begin{array}{c} CH_2-(CH_2)_{\overline{k}}CH_2 \\ | \qquad\qquad | \\ O\text{———}CO \end{array} \quad (e_5)$$

or $$\begin{array}{c} \phantom{O}\ulcorner G \urcorner \\ O\text{———}SO_2, \end{array} \quad (e_6)$$

unsaturated compounds of formula $$\begin{array}{c} R_a \quad R_b \\ | \quad\;\; | \\ CH\!=\!C\!-\!COOM \end{array} \quad (e_7)$$

and diazonium compounds of amines of formula $$H_2N-G_2-(SO_3M)_{m1} \quad (e_8)$$

or $$H_2N-G_3-COOM, \quad (e_9)$$

wherein Hal signifies halogen, preferably chlorine, $Q_2$ signifies —CO— or —SO$_2$—, "alkylene" in formula ($e_1$) is a $C_{1-3}$-alkylene bridge, G signifies butylene-1,3 or -1,4, naphthylene-1,8 or tolylene-α,2, $G_1$ signifies an optionally further substituted benzene radical, $G_2$ signifies an optionally further substituted benzene or naphthalene radical, $G_3$ signifies an optionally further substituted benzene radical, m1 signifies 1 or 2, k signifies 1 to 3, $R_a$ signifies hydrogen, methyl or —COOM and $R_b$ signifies hydrogen or, if $R_a$ signifies hydrogen, also methyl.

As further substituents that are optionally present in $G_1$, $G_2$ or $G_3$ come into consideration substantially inert subtituents, i.e. such as do not react or interfere with the reaction in an undesired way.

Preferred compounds of formula ($e_1$) are chloracetic acid and chloropropionic acid, or their sodium salts.

Preferred compounds of formula ($e_2$) are of formula ($e_2'$)

in which $R_c$ signifies hydrogen or methyl.

Preferred compounds of formula ($e_8$) are of formula ($e_8'$)

in which $R_d$ signifies hydrogen, methyl, methoxy or chlorine, and ($e_8''$)

in which $R_e$ signifies hydrogen or hydroxy.

Preferred compounds of formula ($e_9$) are of formula ($e_9'$)

Where M signifies a cation this is preferably a sodium cation.

As ($E_{12}$) come into consideration any reactants suitable for the introduction of an —X-bonded non-ionic substituent. Mainly come into consideration alkylating agents suitable for the introduction of an optionally substituted alkyl group, or arylating reactants suitable for the introduction of an —X-bonded, optionally substituted aryl group. As substituents that may be present come into consideration substantially inert substituents, i.e. such as do not react or interfere with the reaction in an undesired way or to a disturbing degree.

As ($E_{12}$) there may e.g. be mentioned compounds of formula $$W-E \quad (e_{10}),$$

e.g. halides of formula $$Hal-E \quad (e_{11}),$$

in which

Hal signifies halogen, preferably chlorine, and

E signifies a non-ionic substituent, or diazonium compounds of aromatic primary amines, e.g. of formula $$H_2N-G_1-(SO_2NR^{IV}R^V)_{m2} \quad (e_{12})$$

or $$H_2N-G_1-CO-NR^{IV}R^V, \quad (e_{13})$$

in which $G_1$ is as defined above, $R^{IV}$ signifies hydrogen, $C_{1-4}$-alkyl or phenyl, $R^V$ signifies hydrogen or $C_{1-4}$-alkyl and m2 signifies 0, 1 or 2, α,β-ethylenically unsaturated compounds, e.g. of formula

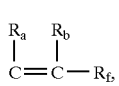 (e₁₄)

in which $R_f$ signifies —CONR$^{IV}$VR$^V$, —SO₂NR$^{IV}$R$^V$ or —CN, and $R^{IV}$, $R^V$, $R_a$ and $R_b$ are as defined above, or lactames, e.g. of formula

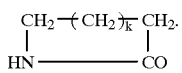 (e₁₅)

E in formulae (e₁₀) and (e₁₁,) may be any non-ionic radical, preferably $C_{1-4}$-alkyl, benzyl, —(C$_{1-4}$-alkylene)-Q₂-NR$^{IV}$R$^V$, —CH₂—CHOH—CH₂—Q₂—NR$^{IV}$R$^V$, —G₁—(SO₂—NR$^{IV}$R$^V$)$_{m2}$ or —G₁—CO—NR$^{IV}$R$^V$, in which G₁, Q₂, R$^{IV}$ and R$_V$ are as defined above.

$R^{IV}$ and $R^V$ preferably signify each hydrogen.

Among the reactants (E₁₂), respectively among the substituents —E, are preferred those that favour or improve the hydrophilicity, in particular the hydrosolubility of the reaction product, in particular those containing hydrosolubilizing substituents —SO₂—NR$^{IV}$R$^V$ or —CONR$^{IV}$R$^V$.

The reactants (E₁₃) are in general compounds suitable for introducing at least one quaternary ammonium group and/or at least one primary, secondary or tertiary amino group linked to the bridging member in a one-step or multi-step reaction. Suitable compounds (E₁₃) are alkylating agents, which may e.g. be represented by the following formula

W—Y—Z₂ (III), in which

W signifies a reactive substituent,

Y signifies a bridging member and

Z₂ signifies a primary, secondary or tertiary amino group of basic character or its protonated derivative or a quaternary ammonium group or an optionally quaternized oligoamine radical.

If in (E₁₃), in particular in formula (III), Z₂ signifies a primary or secondary amino group of basic character or contains such a group, after the reaction of (E₁₃) with (S) or an intermediate dye (Z) it may further be alkylated to the tertiary or quaternary stage. If in (E₁₃) Z₂ is or contains a tertiary amino group of basic character it may further be alkylated to the quaternary stage, if desired.

W may be any suitable leaving group or atom, in formula (III) in particular e.g. alkylsulphate (e.g. etho- or methosulphate), arylsulphate (e.g. tosylate), trifluoroacetate, halogen (e.g. bromide, iodide or preferably chloride), or, where Z₂ is tertiary or quaternary, together with a substituent or bond of Y also an epoxide group; preferably in (E₁₃) W signifies halogen, more preferably chlorine.

In (E₁₃) Y signifies preferably an aliphatic or araliphatic bridging group, in particular a hydrocarbon group that may optionally contain one or more hetero atoms and/or may be substituted. More preferably in (E₁₃) Y is aliphatic and advantageously contains 2 to 9, preferably 2 to 6 carbon atoms.

If it contains 3 or more carbon atoms, it may optionally be branched. If it contains 6 to 9 carbon atoms, it may optionally be cyclic. The substituents W and Z₂ are preferably at a distance of at least 2 carbon atoms from each other, more preferably at least 3 carbon atoms. If Y is substituted it contains a substituent that preferably does not interfere with the reaction, e.g. an aliphatically bonded secondary hydroxy group or a methoxy group. Most preferably in (E₁₃) Y is ethylene-1,2 or 2-hydroxypropylene-1,3.

Z₂ may be or contain a primary, secondary or tertiary amino group or a quaternary ammonium group, in particular Z₂ is one of the following groups

 (z₂₁)

 (z₂₂)

 (z₂₃)

 (z₂₄)

in which $R_{34}$, signifies $C_{1-4}$-alkyl, —(C$_{1-4}$-alkylene)—Q₃—OM, —(C$_{1-4}$alkylene)—Q₃—NH₂, benzyl or sulphobenzyl, $R_{35}$ signifies $C_{1-4}$-alkyl or phenyl optionally substituted with a non-protogenic donor (e.g. methyl or methoxy), or $R_{34}$ and $R_{35}$ together with the nitrogen to which they are linked form a heterocyclic ring, $R_{36}$ signifies $C_{1-4}$-alkyl, Q₃ signifies —CO— or —SO₂—, M signifies hydrogen or a cation or in formula (Z₂₄) $R_{34}$, $R_{35}$ and $R_{36}$ together with the nitrogen atom to which they are linked, form a pyridinium group, and A⁻ signifies a counterion to the ammonium cation.

Among the substituents of aliphatic character and those of aromatic or araliphatic character, those of aliphatic character are preferred in (E₁₃).

Among the $C_{1-4}$-alkyl radicals the lower molecular ones are preferred, in particular ethyl and most preferably methyl.

Among the $C_{1-4}$-alkylene groups in the sulpho-alkyl and sulphamoyl-alkyl groups are preferred ethylene, propylene and butylene.

Among the $C_{1-4}$-alkylene groups in the carboxy-alkyl and carbamoyl-alkyl groups are preferred methylene and ethylene.

Where $R_{34}$ and $R_{35}$ together with the nitrogen to which they are linked form a heterocyclic ring, this is preferably an aliphatic, saturated ring, in particular a pyrrolidine, piperidine, morpholine or N-methylpiperazine ring.

The counterion A⁻ is preferably halide, most preferably chloride.

Particularly preferred compounds of formula (III) correspond to the following formulae

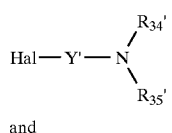

and

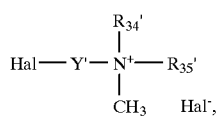

in which

Y' signifies ethylene-1,2 or preferably 2-hydroxypropylene-1,3, $R_{34}'$ signifies methyl, ethyl, benzyl or —$CH_2$—CO—$NH_2$, $R_{35}'$ signifies methyl or ethyl, and Hal signifies halogen, preferably chlorine.

In formula (III") $R_{35}'$ preferably signifies methyl and $R_{34}'$ preferably signifies —$CH_2$—CO—NH, or methyl, most preferably methyl.

$Q_3$ preferably signifies —CO—.

Where M signifies a cation this is preferably an alkali metal cation.

As $Z_2$-containing alkylating agents ($E_{13}$) there may also be employed ethylenically unsaturated compounds, in particular allylic compounds, e.g. such as N,N-dimethyl-N-allylamine and N,N,N-trimethyl-N-allylammonium chloride or methosulphate.

If desired there may also be employed bifunctional alkylating agents, e.g. of the formula $$W—Y—Z_3—Y—W \qquad (IV),$$

in which $Z_3$ signifies a bivalent radical which is a quaternary ammonium group or a secondary or tertiary amino group or is an oligoamine radical in which the amino groups are secondary, tertiary or/and quaternized, or diallylamines or diepoxides in which the amino group is secondary or preferably tertiary or quaternized, Examples of bifunctional alkylating agents are N-methyl-N,N-diallylamine, N,Nimethyl-N,N-diallylammonium chloride, N,N-di-(3-chloro-2-hydroxypropyl-1)-N,N-dimethylammonium chloride, N,N-di-(2,3-epoxypropyl-1)-N,N-dimethylammonium chloride, N,N'-di-(3-chloro-2-hydroxypropyl-1)N,N '-dimethylpiperaz-diinium dichloride, N,N'-di-(2,3-epoxypropyl-1)-N,N'-dimethylpiperaz-diinium dichloride. These may either react with two reactive groups —XH (prefererably 'SH resp. —S⁻) of one same molecule to form a ring, or of two molecules to form a bridge, or a substituent W that has not reacted with —XH may—in particular when containing an activating substituent in β-position—be hydrolyzed.

The groups —$Q_3$—OM may—depending also on the pH—be present also in the form of inner salt with an ammonium group of the molecule, e.g. of the same chain, e.g. as

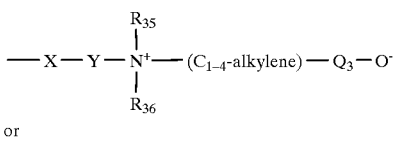

or

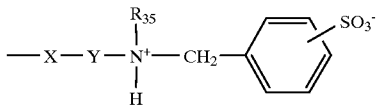

or also with an aminogroup or ammoniumgroup of another chain of the same molecule.

Preferably the components are chosen so that the dye contains at least one hydrosolubilizing substituent per introduced azo-group-containing chain, preferably 0.5 to 1 hydrosolubilizing group or substituent for every introduced aromatic ring (a naphthalene nucleus being considered as two aromatic rings).

The hydrosolubilizing groups may be non-ionic groups (e.g. sulphamoyl or carbamoyl) or ionic groups (in particular anionic ones, e.g. —$SO_3M$ or —COOM preferably in alkali metal salt form, or cationic ones, e.g. quaternary ammonium groups or optionally protonated primary, secondary or tertiary amino groups).

Where it is desired to produce dyes (Z) of good hydrosolubility, it is preferred that the dye does not contain an equivalent or nearly equivalent number of anionic and cationic substituents, but—if the molecule contains ionic hydrosolubilizing groups—that one kind of ionicity clearly prevails, i.e. either the number of cationic groups or the number of anionic groups. In this case preferably 70 to 100%, more preferably 80 to 100%, of the number of ionic substituents are of the same kind of ionicity.

Where, on the contrary, it were desired to produce dyes of low hydrosolubility (e.g. for pigments or disperse dyes), this may also be achieved by selecting the number of ionic substituents so that the number of cationic substituents and the number of anionic substituents is preferably similar or equal, e.g. each ionic kind in the range between 30 and 70%, preferably between 40 and 60% of the total of both ionic kinds.

The reaction of (S) or of an intermediate product (Z) with (E) may take place under any conditions as suitable for the involved reactive groups —XH and reactants (E), e.g. in aqueous medium under alkaline, neutral or weakly acidic conditions, depending on the reactive groups, optionally in the presence of an inert organic solvent.

The reaction of —SH with halides or diazonium compounds ($E_1$) takes place advantageously under distinctly alkaline conditions, preferably in an alkaline solution of (S) or of an intermediate product (Z), in which the alkalinity corresponds to a sodium hydroxide solution of at least 0.0001 normality, e.g. 0.0001 to 10N, e.g. 0.0001 to 8N. Under these alkaline conditions, preferably at pH>12, any thiosulphonate or (oligo)thiosulphide groups may be split to —S⁻ and optionally other by-products (e.g. sulphur, thiosulphate etc., as resulting from the employed particular reaction mixture and reaction conditions), oligosulphide bridges may occasionally also be split During the reaction the-pH is preferably allowed to drop to values below 11, or even below 10, e.g. in the range of 4 to 10. The reaction of amino groups of (S) or of an intermediate product (Z) with halides or the reaction of ethylenically unsaturated compounds ($E_1$) or of cyclic esters or amides ($E_1$) with —XH is preferably carried out under acidic to weakly alkaline pH conditions, e.g. at a pH in the range of 4 to 8, preferably 4.5 to 7. The reaction temperature may vary with (S) resp. intermediate (Z) and with ($E_1$), e.g. up to the boil, and is preferably in the range of 0 to 70° C. Where (S) is a (pre)reduced sulphur dye, resp. the intermediate product (Z) derives from a (pre)reduced sulphur dye and contains reactive groups —XH, and ($E_1$) is an aliphatic halide or a diazonium compound, the reaction may even be exothermic and can then expediently be carried out with cooling. The reaction of —SH is preferably carried out under such conditions that the pH is alkaline during the reaction. The reaction of non-(pre)reduced dyes (S) or (Z) with ($E_1$) is preferably carried out with heating, e.g. at a temperature in the range of 40° C. to reflux. When the reaction has reached the desired degree the pH may suitably be lowered to distinctly acidic values, preferably in the range of from 5 to 2, more preferably 4 to 2.5, in order to complete, interrupt or stop the reaction and/or to stabilize the reaction product. If desired a reducing carbonyl compound, e.g. a reducing sugar, may be added before, during and/or after the reaction, in order to reduce the sulphur dye to an at least partially reduced form with reactive thiol groups, which, if desired, may be reacted with further or other reactants ($E_1$).

If in ($E_1$) $Z_1$ is an ester, halide or anhydride it is mostly hydrolyzed during or after the above reaction, under basic conditions.

As reactants ($E_2$) come into consideration any further reactants suitable for modifying the synthetized dye, in particular ($E_{21}$) reducing carbonyl compounds, e.g. those mentioned above, ($E_{22}$) oxidizing agents, in particular those suitable for oxidizing leuco sulphur dyes to sulphur dyes, e.g. $H_2O_2$, air, oxygen or oxygen-enriched air, and ($E_{23}$) metal complex forming metal compounds.

According to a particular feature of the invention the azo dyes contain metallizable substituents and are metallized to corresponding metal complexes. It is, in particular, possible to employ as a coupling component for ($S_1$) a metallizable component, so that metallizable substituents of ($S_1$) may be involved. in metal complex formation. For metal complex formation the metallizable azo dyes (Z) of then invention may be employed alone or, if desired, in combination with further complexants, e.g. known metallizable azo dyes or other ligands. For metallization there may be employed any metal ions as suitable for complex formation, e.g. iron, chromium, cobalt, manganese, copper, nickel, titanium, zirconyl and/or aluminium ions, respectively compounds ($E_{23}$) suitable for providing these ions. There may, in particular, be employed conventional suitable metal compounds, e.g. acetates or hydrosoluble salts of mineral acids, in particular acetates or hyrosoluble salts of mineral acids, in particular chromium trichloride, cobalt dichloride, copper dichloride or sulphate, iron di- or trichloride, chromium trifluoride, manganese chloride, acetate or sulphate, aluminium chloride, titanium chloride, zirconium tetrachloride or sulphate, zirconyl chloride, cobalt sulphate or nitrate, iron-II- or -III-sulphate, chromium sulphate, chromium or cobalt acetate, potassium chromium sulphate, ammonium chromium sulphate (e.g. chrome alums) and optionally, with the addition of a reducing agent e.g. of glucose, also sodium or potassium chromate or bichromate.

The chromation may be carried out directly up to the 1:2-chromium complex stage or by degrees over the 1:1-chromium complex stage and then further complexation up to the 1:2-chromium complex stage.

Chromation may be carried out in aqueous medium, preferably at pH values in the range of 2 to 10 and temperatures in the range of 95 to 130° C., if necessary under superatmospheric pressure.

Optionally the reaction may be carried out with addition of organic solvents or also only in organic solvents. Suitable organic solvents are preferably such that are miscible with water, have a boiling point above 100° C. and in which the azo dyes and the metal salts are soluble, e.g. glycols, ether alcohols or amides (e.g. ethylene glycol, polyethylene glycols, β-ethoxyethanol, β-methoxyethanol, formamide or dimethylformamide). For the production of asymmetrical 1:2-chromium complex compounds the chromation may be carried out gradually, synthetizing first the 1:1-chromium complex of one of the complexants and from this with a second complexant than the 1:2-complex. The 1:1-chromium complexes may be produced in conventional manner, e.g. under analogous conditions as for the 1:2-chromium complexes, but preferably under stronger acidic pH-values, advantageously at pH<3. It is also of advantage to synthesize 1:2-chromium mixed complexes by simultaneously metallizing different complexants.

The metallization to the corresponding iron-complexes, mainly 1:2-iron-complexes, may be carried out in conventional manner, suitably in aqueous medium, advantageously at pH-values in the range of 3.5 to 6.5, preferably 4 to 6, with heating. Preferably the metallization to iron complexes is carried out at temperatures in the range of 40° C. to reflux temperature, preferably 60 to 100° C.

The metallization to the corresponding cobalt-complexes, mainly 1:2-cobalt-complexes, may be carried out in conventional manner, suitably in aqueous medium, advantageously at pH-values in the range of 9 to 12, preferably 10 to 11, optionally with heating. Preferably the metallization to cobalt complexes is carried out at temperatures in the range of 30° C. to 90° C., preferably 40 to 70° C.

The metallization to copper complexes is preferably carried out at pH 7 to 10 and at tempeatures in the range of 60 to 100° C., preferably with copper sulphate.

Other metallizations may be carried out in analogous way, as conventional r se.

The synthetized dyes may be purified, if desired, in any manner conventional per se, e.g. by precipitation (e.g. by salting out or by acidification with a strong mineral acid) and filtration and optionally re-precipitation and filtration, and/or by microfiltration and, if desired, ultra-filtration. Where desired, the dye solution may be further purified and/or concentrated by means of suitable membrane filtrations. If desired, the purified dye solutions may be dried to dye-powder or -granulate.

If desired, the dye may, upon isolation or dialysis, be blended with suitable blending agents conventional per se, e.g. alkali metal salts (sodium carbonate, sodium sulphate) non-electrolyte blending agents (mainly oligosaccharides, e.g. dextrine) or/and with surfactants (e.g. as suitable as wetting agents), in particular non-ionic and/or anionic or cationic surfactants. There may e.g. be mentioned hydrocarbon sulphonates, sulphonated castor oil, sulphosuccinates, lignine sulphonate, hydrophilic polysaccharide derivatives, ethoxylated alkylphenols or fatty alcohols and optionally quatemized and/or ethoxylated fatty amines or amonoamines or aminoamides. Anionic dyes (Z) are preferably blended with anionic and/or non-ionic surfactants, cationic dyes (Z) are preferably blended with cationic and/or non-ionic surfactants, non-ionic dyes (Z) may be blended with non-ionic and/or anionic or cationic surfactants. If a surfactant is employed the weight ratio of the surfactant to the dye is advantageously in the range of 5:95 to 40:60. If desired, especially if the composition contains a surfactant, as indicated above, it may be formulated with water as a liquid concentrated dye-composition, preferably with a dry-substance content in the range of 10 to 70%, more preferably 20 to 50% by weight, referred to the weight of the composition.

The dyes of the invention may be of any hue, depending on the employed components. According to the invention, it is in particular possible to obtain dyes of very intensive shade, depending on the chosen components, or it is also possible to modify a shade of (S) by employing as (Dz) or as a B-containing component a component of a similar, slightly modified shade and/or, if desired, by metal complex formation.

The hydrosoluble dyes of the invention are suitable for dyeing any substrates dyeable with hydrosoluble dyes, in particular with anionic dyes for the preferred dyes of the invention that contain hydrosoluble sulpho groups. Suitable substrates include natural and regenerated cellulose, polyurethanes, basically modified high polymers (e.g. basically modified polypropylene), natural or synthetic polyamides or anodized aluminium, in particular, however, leather substrates. The substrate to be dyed may be in any conventional form, e.g. in the form of loose fibres, filaments, yarns, woven or knitted goods, non-woven webs, carpets, half-ready-made and ready-made soft goods and tanned leather or pelts. The dyes may be employed in any desired concentration up to the saturation of the substrate. The dyeing may be carried out by any conventional methods that are suitable for the substrate to be dyed, e.g. by exhaustion or impregnation methods (e.g. padding, spraying, foam application or application with a roller, or printing), preferably from aqueous medium; for synthetic substrates, the dye may optionally also be incorporated into the synthetic mass. Paper may be dyed in the pulp or after sheet formation.

The dyes of the invention are, however, mainly suitable for the dyeing of leather and pelts.

Any kinds of leather which are conventionally dyed from aqueous medium are suitable, particularly grain leather (e.g. nappa from sheep, goat or cow and box-leather from calf or cow), suede leather (e.g. velours from sheep, goat or calf and hunting leather), split velours (e.g. from cow or calf skin), bukskin and nubuk leather; further also wool-bearing skins and furs (e.g. fur-bearing suede leather). The leather may have been tanned by any conventional tanning method, in particular vegetable, mineral, synthetic or combined tanned (e.g. chrome tanned, zirconyl tanned, aluminium tanned or semi-chrome tanned). If desired, the leather may also be re-tanned; for re-tanning there may be used any tanning agent conventionally employed for re-tanning, e.g. mineral, vegetable or synthetic tanning agents [e.g. chromium, zirconyl or aluminium derivatives, quebracho, chestnut or mimosa extracts, aromatic syntans, polyurethanes, (co) polymers of (meth)acrylic acid compounds or melamine/, dicyanodiamide/and/or urea/formaldehyde resins]. Thus leathers of very high to very low affinity for anionic dyes may be used.

The leathers may be of various thicknesses, thus, there may be used very thin leathers, such as book-binder's leather or glove-leather (nappa), leather of medium thickness, such as shoe upper leather, garment leather and leather for handbags, or also thick leathers, such as shoe-sole leather, furniture leather, leather for suitcases, for belts and for sport articles; hear-bearing leathers and furs may also be used. After tanning (in particular after a re-tanning) and before dyeing, the pH of the leather is advantageously set to values in the range of 4 to 8 (the leather is "neutralized"); depending on the kind of the leather, there may be chosen an optimum pH range, e.g. for grain leather pH values in the range of 4 to 6, for suede leather and split velours and for very thin leathers pH-values in the range of 4.5 to 8, for intermediately dried suede leathers and intermediately dried split velours the pH may range in the scope of 5 to 8. For the adjustment of the pH-value of the leather there may be employed conventional assistants; for tanned leather of acidic character the pH may be adjusted by addition of suitable bases, e.g. ammonia, ammonium bicarbonate or alkali metal salts of weak acids, e.g. sodium formate, sodium acetate, sodium bicarbonate, sodium carbonate or sodium sulphite, of which sodium formate and sodium bicarbonate are preferred. Sodium carbonate and sodium bicarbonate are usable in particular as second bases for the exact adjustment of the superficial pH-value of the leather. Mineral tanned leather may, if desired, also be masked, e.g. with alkali metal formate, oxalate or polyphosphate or e.g. with titanium/potassium oxalate.

The dyeing may be carried out in a manner known per se suitably in an aqueous medium and under conventional temperature and pH conditions, in particular in the temperature range of 20 to 80° C., preferably 25 to 70° C., milder temperature conditions, in particular in the range of 25 to 40° C., being preferred for the achievement of deeper penetrations and for the dyeing of wool-bearing skins and furs. The pH-values of the dye-bath may, in general, range broadly, mainly from pH 8 to pH 3; in general the dyeing may be advantageously begun at higher pH-values and concluded at lower pH-values. Preferably the dyeing is carried out at pH-values $\geq 4$, in particular in the pH-range of 8 to 4, and for the conclusion of the dyeing procedure the pH-value is lowered (e.g. by addition of an acid conventional in the leather dyeing technique such as acetic acid or formic acid) preferably to values in the range between 4 and 3. The dye concentration may range broadly, if desired, up to the saturation degree of the substrate, e.g. up to 5%, referred to the wet weight of the substrate. The dyeing may be carried out in one or more stages, e.g. in two stages, optionally with insertion of charge reversal of the substrate by means of conventional cationic assistants.

The dyes of the invention may, if desired, be employed in combination with conventional dyeing assistants, mainly non-ionic or anionic products (in particular surfactants, preferably hydrophilic polysaccharide derivatives, polyoxyethylated alkylphenols or alcohols, lignosulphonates or sulpho group-containing aromatic compounds).

A fatting may, if desired, be carried out before and/or after the dyeing process, in particular also in the same liquor. For fatting after the dyeing process the fatting agent is advantageously added before the pH of the liquor is lowered, preferably to values between 3 and 4.

For the fatting (in particular fat-liquoring) step there may be used any conventional natural animal, vegetable or mineral fat, fat oil or wax, or chemically modified animal or vegetable fat or oil, which include in particular tallow, fish oils, neats-foot oil, olive oil, castor oil, rapeseed oil, cottonseed oil, sesame oil, corn oil and japanese tallow, and chemically modified products thereof (e.g. hydrolysis. transesterification, oxidation, hydrogenation or sulphonation products), bees-wax, chinese wax, carnauba wax, montan wax, wool fat, birch oil, mineral oils with boiling range within 300 and 370° C. (particularly the so-called "heavy alkylates"), soft paraffin, medium paraffin, vaseline and methyl esters of $C_{14-22}$-fatty acids; and synthetic leather fatting agents, including esters, in particular partial esters of polybasic acids (e.g. phosphoric acid) with optionally oxyethylated fatty alcohols. Of the above mentioned the methyl ester, the sulphonation products and the phosphoric acid partial esters are particularly preferred. By the term "sulphonation" for the fatting agents, there is meant generally the introduction of the sulpho group including also the formation of a sulphato group (="sulphating") and the introduction of a sulpho group by reaction with a sulphite or $SO_2$ (="sulphiting").

A conventional leather softener, in particular a cationic leather softener may, if desired, be applied in a final step, particularly if fatting has been carried out with a sulphonated fat-liquoring agent. The treated substrate may then be further treated in conventional manner, e.g. washed or/and rinsed, drained, dried and cured.

According to the invention there may be obtained azo dyes resp. metal complex dyes that display, even with a relatively low number of hydrosolubilizing substituents, a high solubility in water, especially where anionic dyes are in alkali metal salt form. They are distinguished by their stability to electrolytes (in particular inorganic ions), specifically also to bases and acids, and are also distinguished, especially on leather, by their build-up and a high degree of insensitivity to variations of the affinity of the leather towards anionic dyes, very level dyeings of outstanding penetration and high colour-yield being obtainable. The dyeings, particularly on leather, especially those obtained with metal complexes, have excellent fastness properties, for example wet-fastnesses, fastness to dry cleaning and to rubbing, light-fastness and stability to PVC-migration. They are readily combinable with other dyes, in particular with dyes of similar tinctorial behaviour. There may be obtained very regular, intense, fine dyeings. In admixture with corresponding dyes with which the dyes of the invention are combinable, there may also be obtained very intense and regular dyeings of high yield and optimum fastnesses. By the choice of the substituents some of the properties of the dyes (e.g. solubility, shade, build-up, penetration, levelness etc.) may be varied accordingly.

In the following Examples parts and percentages are, if not otherwise indicated, by weight; parts by weight relate to parts by volume as grams to milliliters. The temperatures are indicated in degrees Celsius. In the Application Examples the respective dyes are used in blended form containing 30% of the respective dye and the blending agent being Glauber's salt (sodium sulphate), the other products employed in the Application Examples are commercially available products conventional in the treatment of leather.

EXAMPLE 1

24.9 parts of sulphanilic acid are diazotized in conventional way and coupled in acidic medium to 41.6 parts of 4-amino-5-hydroxy-naphthalene-2,7-disulphonic acid. The coupling reaction is allowed to complete overnight. At the same time 40.3 parts of 4-amino-(4'-aminophenyl)-benzenesulphonamide are bis-diazotized in conventional way, and the obtained bis-diazocompound is added dropwise into the previous monoazo suspension. The pH is then raised to 9 by addition of 46 parts of a 25% sodium hydroxide solution and stirring is continued for 30 minutes. Then the pH is adjusted to 13 by addition of 17 parts by volume of a 25% sodium hydroxide solution, and immediately afterwards 50 parts of a 25% solution of C.I. Leuco Sulphur Black 1 [obtained by dissolving the press-cake produced according to part a) of Example 1 of GB-A-2 255 981 by addition of ⅓ of its weight of a 50% NaOH solution and diluting with water] are quickly added. The reaction takes place with $N_2$-development. When the reaction of the diazonium compound is completed and no more free diazo compound can be detected, the pH is adjusted to 5 by the addition of 15 parts of hydrochloric acid. Finally, the dye is salted out and suction filtered. There are obtained 200 parts of a black dye.

EXAMPLE 2

19 parts of 1-hydroxy-2-amino-4-benzenesulphonic acid are diazotized in conventional way and coupled to 11 parts of resorcine in basic medium. At the same time the bisdiazocompound of 26 parts of 4-amino-(4'-aminophenyl)-benzenesulphonamide are bis-diazotized in conventional way. This bisdiazo compound is added to the previous monoazo compound at pH 9 and stirring is continued for 30 minutes, then the pH is adjusted to 12 by the addition of 20 parts of 25% sodium hydroxide solution, and immediately afterwards 90 parts of C.I. Leuco Sulphur Brown 10 [in the form of a 6.75% solution produced by dissolving the press-cake obtained according to part a) of Example 6 of GB-A-2 255 981 with 6% of its weight of 50% NaOH solution and dilution with water] are added during 1 minute. The reaction takes place with $N_2$-development. When the reaction of the diazonium compound is completed and no more free diazo compound can be detected, the dye is salted out and suction filtered. There are obtained 110 parts of a brown dye.

EXAMPLE 3

118 parts of a 25% solution of C.I. Leuco Sulphur Black 1 (pH=13.6) are mixed with 18.5 parts of 3-chloro-2-hydroxypropane-1-sulphonic acid. The temperature is raised to 90° C., keeping the pH at 11 by addition of 14 parts of 25% sodium hydroxide solution. When the pH is stable, the temperature is allowed to drop. When the temperature has reached 25° C., 60 parts of 30% sodium nitrite solution are added, and the reaction mass is added dropwise into a solution of 80 parts of 30% hydrochloric acid and 100 parts of ice. The acidic suspension is stirred for 4 hours and then the excess of sodium nitrite is destroyed with aminosulphonic acid. The obtained suspension is added slowly dropwise into a solution of 17.4 parts of 3-methyl-1-phenyl-5-pyrazolone dissolved in 100 parts of water and 14 parts of 25% sodium hydroxide solution. During the addition, the pH is kept above 10 with 40 parts of 25% sodium hydroxide solution. One half of the obtained dye solution is acidified to pH 4.5 by addition of 7 parts of 30% hydrochloric acid solution and then suction filtered. There are obtained 30 parts of a black dye. The other half of the above dye solution is employed in the following Example 4.

EXAMPLE 4

The remaining half of the non-acidified dye solution obtained in the above Example 3 is acidified to pH 5 by addition of 4 parts of 30% hydrochloric acid solution. The temperature is raised to 60° C. and 6.4 parts of 40% iron chloride solution is added, keeping the pH at 5 by addition of 2 parts of 35% sodium hydroxide solution and stirring is continued for 1 hour. Then the solution is cooled to ambient temperature, the pH is adjusted to 7 by addition of 10 parts of 25% sodium hydroxide solution and the dye is salted out and suction filtered. There are obtained 30 parts of a black dye.

EXAMPLE 5

100 parts of C.I. Sulphur Black 1 are suspended in 200 parts of water and 20 parts of 30% sodium nitrite solution.

This suspension is added dropwise into 60 parts of 30% hydrochloric acid solution and 100 parts of ice. The diazotization takes place, with clear nitrite excess, for 12 hours. After destroying the nitrite excess with aminosulphonic acid, the obtained diazo compound is added into a solution of 27.8 parts of 1-phenyl-3-methyl-5-pyrazolone4'-sulphonic acid in 150 parts of water and 1 part of 25% sodium hydroxide solution. During the addition the pH is kept at 10.5 by addition of 56 parts of 25% sodium hydroxide solution. When the pH is stable, the solution is stirred at 60° C. for 1 hour. Then, the temperature is allowed to drop, the pH adjusted to 4.5 with 8 parts of 30% hydrochloric acid solution and the dye is salted out and suction filtered. There are obtained 120 parts of a black dye.

EXAMPLE 6

40.3 parts of 4-amino-(4'-aminophenyl)-benzenesulphonamide are diazotized in conventional way and added into a suspension of 26.1 parts of 4-amino-5-hydroxy-napthalene-2,7-isulphonic acid in 75 parts of water and 25 parts of ice. The suspension is stirred for 12 hours. The pH is then adjusted to 13 with 11 parts of 25% sodium hydroxide solution and 37.5 parts of a 25% solution of C.I. Leuco Sulphur Black 1 [obtained as indicated in Example 1] are added during 1 minute. Finally the pH is adjusted to 7 with 18 parts of 30% hydrochloric acid solution and the dye is suction filtered. There are obtained 78 parts of a bluish black dye.

EXAMPLE 7

The diazo compound of 18.1 parts of sulphanilic acid are added into a suspension of 31.9 parts of 4-amino-5-hydroxy-napthalene-2,7-disulphonic acid in 150 parts of water and 50 parts of ice. The coupling reaction is allowed to complete overnight. At the same time the diazo compound of 23.4 parts of 1-hydroxy-2-amino-4-nitro-6-benzenesulphonic acid is added into a solution of 11 parts of 1,3-dihydroxybenzene in 100 parts of water and 8 parts of 25% sodium hydroxide solution, keeping the pH at 9.5 with 20 parts of 25% sodium hydroxide solution. The two previously prepared monoazo dyes are admixed with each other in the same vessel and the suspension of the bis-diazonium compound of 52.6 parts of 4-amino-(4'-aminophenyl)-benzenesulphonamide is added to the mixture keeping the pH at 9 by addition of 84 parts of 25% sodium hydroxide solution, and stirring is continued for 1 hour. The pH is then raised to 12.5 with 42 parts of 25% sodium hydroxide solution, 99 parts of a 25% solution of C.I. Leuco Sulphur Black 1 [obtained as indicated in Example 1] are added in 5 minutes and stirring is continued for 1 hour. Then the pH is adjusted to 6.5 with 57 parts of 30% hydrochloric acid solution and the dye is suction filtered. There are obtained 231 parts of a black dye.

EXAMPLE 8

Example 7 is repeated with the difference that 17.2 parts of 1-amino 4benzenesulphonamide are employed instead of the 18.1 parts of sulphanilic acid. There are obtained 200 parts of a black dye.

EXAMPLE 9

Example 8 is repeated with the difference that 19.2 parts of 1-hydroxy-2-amino-4-benzenesulphonamide are employed instead of the 23.4 parts of 1-hydroxy-2-amino-4-nitrobenzene-6-sulphonic acid. There are obtained 200 parts of a black dye.

EXAMPLE 10

Example 7 is repeated, with the difference that a mixture of 8.6 parts of 1-aminobenzene-4-sulphonamide and 12.4 parts of sulphanilic acid are employed instead of the 18.1 parts of sulphanilic acid.

EXAMPLE 11

Example 10 is repeated, with the difference that before the isolation by acid addition, the diazo compound of 69 parts of 1-amino4-hydroxy-benzenesulphonamide and the diazo compound of 100 parts of sulphanilic acid are added into the dye solution. Then the pH is adjusted to 6.5 with 50 parts of 30% hydrochloric acid solution and the dye is suction filtered. There are obtained 250 parts of a black dye.

EXAMPLE 12

Example 7 is repeated with the difference that 19.2 parts of 1-hydroxy-2-amino-4-benzenesulphonamide are employed instead of the 23.4 parts of 1-hydroxy-2-amino4-nitro-6-benzenesulphonic acid. There are obtained 230 parts of a black dye.

EXAMPLE 13

Example 7 is repeated, with the difference that, before the isolation by acid addition, the diazo compound of 69 parts of 1-amino-4-hydroxy-benzenesulphonamide and the diazo compound of 100 parts of sulphanilic acid are added into the dye solution. Then the pH is adjusted to 6.5 with 50 parts of 30% hydrochloric acid solution and the dye is suction filtered. There are obtained 250 parts of a black dye.

EXAMPLE 14

The bisdiazo compound of 26.3 parts of 4-amino-(4'-aminophenyl)-benzenesulphonamide is added into a suspension of 31.9 parts of 4-amino-5-hydroxy-napthalene-2,7-disulphonic acid in 150 parts of water and 50 parts of ice. The coupling reaction is allowed to complete overnight, and the pH is then adjusted to 5 with 55 parts of 25% sodium hydroxide solution. Then a solution of 10.8 parts of m-phenylenediamine in 40 parts of water and 5 parts of 30% hydrochloric acid solution are added, and the pH is increased to 5 with 5 parts of 25% sodium hydroxide solution. After adjusting the pH to 8.5 with 10 parts of 25% sodium hydroxide solution, a suspension of the bisdiazo compound of 26.3 parts of 4-amino-(4'-aminophenyl)-benzenesulphonamide is added, keeping the pH at 8.5 with 47 parts of 25% sodium hydroxide solution. Finally, the pH is adjusted to 11.5 with 17 parts of 25% sodium hydroxide solution and 50 parts of a 25% solution of C.I. Leuco Sulphur Black 1 [obtained as indicated in Example 1] are added in 5 minutes. The pH is adjusted to 7 with 11 parts of 30% hydrochloric acid solution and the dye is suction filtered. There are obtained 133 parts of a black dye.

EXAMPLE 15

The diazo compound of 18.1 parts of sulphanilamide are added into a suspension of 31.9 parts of 4-amino-5-hydroxy-napthalene-2,7-disulphonic acid in 150 parts of water and 50 parts of ice. The coupling reaction is allowed to complete overnight. At the same time the diazo compound of 33.5 parts of 4-amino-5-hydroxy-napthalene-2,7-disulphonic acid is added into a solution of 11 parts of 1,3-dihydroxybenzene in 50 parts of water, keeping the pH at 9 with 10 parts of 25% sodium hydroxide solution. When the two coupling reactions are completed the two reaction mixtures are admixed with each other and the suspension of the bis-diazonium compound of 26.3 parts of 4-amino-(4'-aminophenyl)-benzenesulphonamide is added to the mixture keeping the pH at 9 by addition of 20 parts of 25% sodium hydroxide solution, and stirring is continued for 1 hour. 70 parts of a 25% solution of C.I. Leuco Sulphur Black 1 [obtained as indicated in Example 1] are added and stirring is continued for 1 hour. Then the dye is salted out and suction filtered. There are obtained 250 parts of a black dye.

EXAMPLE 16

Example 15 is repeated with the difference that instead of 70 parts of a 25% solution of C.I. Leuco Sulphur Black 1 there are employed 140 parts of a coupling component composition produced as follows:

23.9 parts of γ-acid (6-amino-4-hydroxy-naphthalene-2-sulphonic acid) are diazotized in conventional way and added to a solution of 35 parts of a 25% solution of C.I. Leuco Sulphur Black 1 in 50 parts of water, keeping the pH at 12 with 20 parts of 25% sodium hydroxide solution. When no free diazocompound is any more detected, the pH of the solution is adjusted to 9 with 10 parts of 30% hydrochloric acid solution.

There are obtained 250 parts of a black dye.

EXAMPLE 17

Example 15 is repeated with the difference that instead of 70 parts of a 25% solution of C.I. Leuco Sulphur Black 1 there are employed 140 parts of a coupling component composition produced as follows:

31.9 parts of H-acid (4-amino-5-hydroxy-naphthalene-2,7-disulphonic acid) are diazotized in conventional way and added to a solution of 35 parts of a 25% solution of C.I. Leuco Sulphur Black 1 in 50 parts of water, keeping the pH at 12 with 20 parts of 25% sodium hydroxide solution. When no free diazocompound is any more detected, the pH of the solution is adjusted to 9 with 10 parts of 30% hydrochloric acid solution.

There are obtained 250 parts of a black dye.

Application Example

Chrome-tanned cow leather of 2.3 mm thickness is retanned at 35° C. with 100% of water and 4% of polymethacrylate retanning agent. After 30 minutes of drum rotation 1% of 25% ammonia and 3% of the dye obtained according to Example 1 are added to the same bath and dyeing is continued for 30 minutes. Then 3% of a phenolic syntan and 3% of a urea/formaldehyde condensation product are added and drumming is continued for 60 minutes. Then 100% of water at 60° C. and, portionwise, 3% of 85% formic acid are added, the pH of the bath is 3.6. After 60 minutes the bath is drained off and the leather is washed with 300% of water at 60° C. during 10 minutes. Then the leather is fat-liquored with 5% of a mixture of phosphoric acid partial esters of $C_{14-16}$-fatty alcohols and stearylalcohol-pentaethyleneglycolether during 60 minutes. Then 1% of 85% formic acid is added and after 60 minutes the bath is drained off and the leather is washed with 300% of cold water during 10 minutes, drained, dried and cured as usual. The treated leather is optimally penetration-dyed in black in a high yield and the dyeing is of optimum fastenesses.

Analogously as the dye of Example 1 the dyes of each of Examples 2 to 17 are employed in the above Application Example.

We claim:

1. An azo dye (Z) which contains at least one azo group and at least one chromophoric radical wherein at least one chromophoric radical comprises a radical of a dye (S) and which is obtainable by reacting at least one azo group-containing diazonium compound (Dz) with at least one dye (S) and/or by coupling the diazonium compound of at least one diazotizable dye (S), optionally over at least one middle component (Mk), to at least one coupling component (B) and optionally subjecting the product of said reacting or said coupling to a further modification reaction, each said dye (S) being an optionally modified, optionally (pre)reduced sulfur dye, or a mixture of such azo dyes (Z).

2. A metal complex of at least one metallizable azo dye (Z) according to claim 1, or a mixture thereof.

3. A process for dyeing a substrate dyeable with sulphur dyes or azo dyes which comprises dyeing said substrate with a dye according to claim 2.

4. A process according to claim 3 wherein the substrate is leather.

5. A process for producing an azo dye (Z) containing at least one azo group and at least one chromophoric radical wherein at least one chromophoric radical comprises a radical of an optionally modified, optionally (pre)reduced sulphur dye (S) or a mixture thereof, which process comprises a) coupling the diazonium compound of at least one optionally modified, optionally (pre)reduced sulphur dye ($S_1$), optionally over at least one middle component (Mk), to at least one coupling component (B) and optionally further modifying the resulting product, or b) reacting at least one azo-group-containing diazonium compound (Dz) with at least one optionally modified, optionally (pre)reduced sulphur dye ($S_2$) and optionally further modifying the resulting product.

6. A process according to claim 5 wherein the optionally (pre)reduced sulphur dye (S) is a dye of the general formula (I)

in which X signifies —O—, —S— or —NH—,

D is the y-valent radical of the dye (S) and y signifies a figure from 1 to the maximum functionality of the optionally (pre)reduced sulphur dye of formula (I), and a) the diazonium compound of the dye ($S_1$) is a product of diazotizing a dye of said general formula (I) having at least one diazotizable amino group, or b) the dye ($S_2$) contains at least one reactive group capable of reacting with the diazonium compound (Dz).

7. A process according to claim 6 wherein the diazotizable amino group is a primary amino group and the dye ($S_2$) contains at least one substituent capable of reacting with a diazonium compound to form a (thio)ether bridge with cleavage of the nitrogen of the diazonium compound.

8. A process according to claim 7 wherein the dye ($S_2$) contains at least one oxalate or thiolate group which reacts with the diazonium compound (Dz).

9. A process according to claim 14 wherein the dye (S) is selected from the group consisting of C.I. Leuco Sulphur Blacks 1, 2, 11 and 18, C.I. Leuco Sulphur Reds 10 and 18, C.I. Leuco Sulphur Blues 3, 7, 11, 13, 15 and 20, C.I. Reduced Vat Blue 43, C.I. Leuco Sulphur Greens 2, 16, 35 and 36, C.I. Leuco Sulphur Browns 1, 3, 10, 21, 26, 31, 37, 52, 95 and 96, C.I. Leuco Sulphur Orange 1, C.I. Leuco Sulphur Yellows 9 and 22 and the corresponding non-reduced or non-leuco dyes.

10. An azo dye (Z) obtainable by the process of claim 6.

11. An azo dye (Z) obtainable by the process of claim 5.

12. A process for dyeing a substrate dyeable with sulphur dyes or azo dyes which comprises dyeing said substrate with an azo dye (Z) according to claim 11.

13. A process according to claim 12 wherein the substrate is leather.

14. A hydrosoluble azo dye (Z) obtainable by the process of claim 5.

15. A process according to claim 6 wherein the dye (S) is a (pre)reduced sulphur dye.

16. A process according to claim 6 wherein, when the dye ($S_1$) or ($S_2$) is a modified dye, the modification comprises the introduction of a hydrophilizing group.

17. A process according to claim 16 wherein the modification comprises introduction of a substituent containing a sulpho, carboxy or amide group by alkylation and/or arylation.

18. A process according to claim 5 which comprises coupling the diazonium compound of a diazo component comprising at least one optionally modified, optionally (pre)reduced diazotizable amino group-containing sulphur dye ($S_1$).

19. An azo dye (Z), or mixture thereof, obtainable by the process of claim 18 wherein at least one is an amino group-containing, optionally modified, optionally (pre) reduced sulphur dye ($S_1$).

20. A process according to claim 5 wherein the resulting product from a) or b) is further modified by reaction with a reactant (E).

21. A hydrosoluble azo dye (Z) obtainable by the process of claim 20.

22. A process according to claim 6 wherein the dyes ($S_1$) and ($S_2$) are modified with a hydrophilizing substituent.

23. A hydrosoluble azo dye (Z) obtainable by the process of claim 22.

24. A process according to claim 6 wherein the azo group-containing diazonium compound (Dz) is selected from the group consisting of
   1. the product of coupling the diazo compound of a diazo component (A) to one middle component (Mk) or sequentially to more middle components (Mk) and finally diazotizing the terminal amino group;
   2. the product of coupling the diazo compound of a diazo component (A), optionally over at least one middle component (Mk), to a bis-coupling component (Bb) and then coupling selectively thereto one diazonium group of a component (Aa) which is a bis-diazotized bis-diazo component or a component containing one diazotizable amino group and one substituent that can be converted afterwards to an amino group;
   3. the product of coupling a diazotized bis-diazo component (Aa) at one side to a coupling component (B), optionally over at least one middle component (Mk), converting any protected amino group or nitro group to primary amino which is diazotized and optionally coupling the resulting diazonium compound to a middle component (Mk) or sequentially to more middle components (Mk), the terminal amino group of which is then diazotized; or
   4. diazotized sulphur dye ($S_1$),
wherein (A) is a diazotizable amine of the benzene or naphthalene series, (B) is the radical of a coupling component H—B of the benzene, naphthalene, heterocyclic or open-chain methylene-active series, (Bb) is an aminonaphthole containing one or two sulpho groups, resorcine, metaaminophenol or metaphenylenediamine and (Mk) is an aminonaphthalene or aminonaphthole, optionally containing one or two sulpho groups, or a bicyclic compound of the formula ($mk_1$)

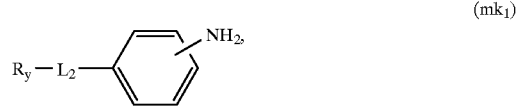

in which $L_2$ is a group —$Q_1$—L, $R_y$ is a homocyclic or heterocyclic radical capable of a coupling reaction, $Q_1$ is —CO—, —$SO_2$— or the direct bond and L is —O—, —NH— or the direct bond.

25. An azo dye (Z) obtainable by the process of claim 24.

26. A process according to claim 24 wherein (A) contains at least one sulpho group, carboxy group, carbamoyl group or sulphamoyl group, the coupling compound H—B contains at least one substituent that activates the compound H-B for coupling and which is an aromatically bound or enolic, optionally etherified hydroxy group or an optionally substituted amino group.

27. A process according to claim 24, wherein (A) is a compound of the formula

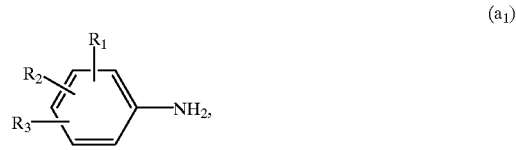

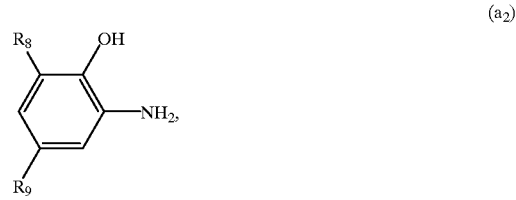

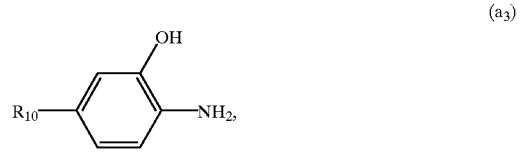

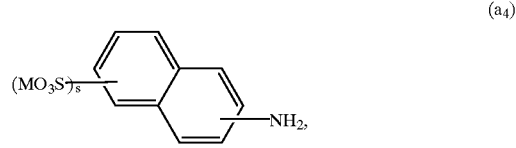

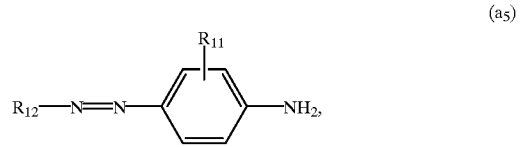

-continued

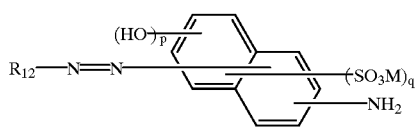
(a₆)

or

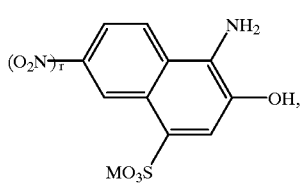
(a₇)

wherein $R_1$ signifies hydrogen, nitril, trifluoromethyl, nitro, —SO₃M, —SO₂NR₄R₅, —COOM or —CONR₄R₅, $R_2$ signifies hydrogen, nitro, —SO₃M, —SO₂NR₄R₅, trifluoromethyl, nitril, —COOM, —CONR₄R₅, $C_{1-4}$-alkyl, $C_{1-4}$-alkoxy, halogen or $C_{1-2}$-mercaptoalkyl, $R_3$ signifies hydrogen, $C_{1-4}$-alkyl, $C_{1-4}$-alkoxy, halogen, $C_{1-2}$-mercaptoalkyl, —NH—Ac, —NH—CO—O—CH₃ or a radical of formula

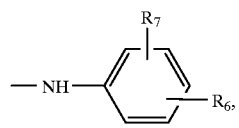
(a')

$R_4$ signifies hydrogen, $C_{1-4}$-alkyl, $C_{1-3}$-alkylene-R' or $C_{2-3}$-hydroxyalkyl, $R_5$ signifies hydrogen, $C_{1-4}$-alkyl, $C_{1-3}$-alkylene-R', $C_{2-3}$-hydroxyalkyl, benzyl or a radical of formula

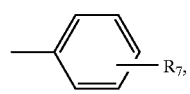
(a")

R' signifies nitril, carbamoyl or —COOM, $R_6$ signifies hydrogen, nitro or —SO₃M.

$R_7$ signifies hydrogen, methyl, chlorine, nitro, —COOM or —SO₃M, $R_8$ signifies hydrogen, halogen, nitro, —SO₃M, —SO₂NR₄R₅, methylsulphonyl, $C_{1-4}$-alkyl or —NH—Ac, $R_9$ signifies hydrogen, halogen, nitro, —SO₃M, —SO₂NR₄R₅, methylsulphonyl, $C_{1-4}$-alkyl or —NH—Ac, $R_{10}$ signifies nitro, —SO₃M or —SO₂NR₄R₅, $R_{11}$ signifies hydrogen, $C_{1-4}$-alkyl, $C_{1-4}$-alkoxy, hydroxy, —NH₂ or —NH—Ac, $R_{12}$ signifies the radical of a diazocomponent deriving from the diazotization of an amine of formula (a₁), (a₂), (a₃), (a₄) or (a₇), Ac signifies an aliphatic acyl group, M signifies hydrogen or an alkali metal cation, p signifies 0 or 1, q signifies 0, 1 or 2, r signifies 0 or 1 and s signifies 0 or 1;

(Aa) is an amine of formula (a₁), (a₂), (a₃) or (a₇) containing a nitro group, or of formula (a₁), (a₂), (a₅) or (a₇) containing a group —NH—Ac, or of formula (Aa₁)

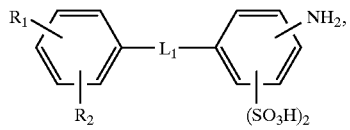
(Aa₁)

wherein $L_1$ signifies a heteroatomic bridging member or a methylene bridge, $R_x$ signifies primary amino, acetylamino or nitro, and z signifies 0 or 1; and H—B is a compound of the formula

(b₁)

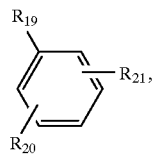
(b₂)

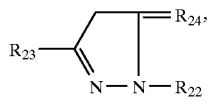
(b₃)

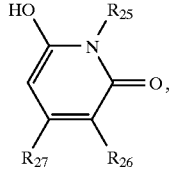
(b₄)

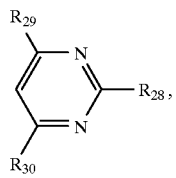
(b₅)

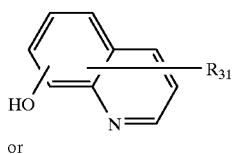
(b6)

or

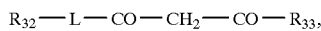
(b7)

wherein $R_{13}$ signifies hydrogen, —$OR_{17}$ or —$NHR_{17}$, $R_{14}$ signifies —$OR_{17}$ or —$NHR_{17}$, $R_{15}$ signifies hydrogen, —$SO_3M$, —$SO_2NR_4R_5$, —COOM or —$CONR_4R_5$, $R_{16}$ signifies hydrogen, —$SO_3M$, —$SO_2N_4R_5$, —COOM or —$CONR_4R_5$, $R_{17}$ signifies hydrogen, $C_{1-4}$-alkyl, Ac' or a radical of formula

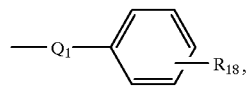
(b')

Ac' signifies the acyl radical of an aliphatic carboxylic acid, $Q_1$ signifies —CO—, —$SO_2$— or the direct bond, $R_{18}$ signifies hydrogen, methyl, —NH—Ac, —COOM or —$NO_2$ or, if in formula (b') $Q_1$ signifies —CO— or —$SO_2$—, also —$NH_2$, $R_{19}$ signifies —OH or —$NH_2$, $R_{20}$ signifies hydrogen, $C_{1-4}$-alkyl, $C_{1-4}$-alkoxy, —OH, —NR"R"' or —NH—Ac, $R_{21}$ signifies hydrogen, $C_{1-4}$-alkyl or $C_{1-4}$-alkoxy, R" and R"', independently, signify hydrogen, $C_{1-2}$-alkyl or $C_{2-3}$,hydroxy-alkyl, $R_{22}$ signifies hydrogen, sulphonaphthyl or a radical of formula

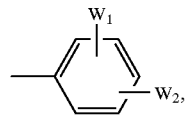
(b")

$W_1$ signifies hydrogen, halogen, methyl, methoxy or —COOM, $W_2$ signifies hydrogen, halogen, trifluoromethyl, nitril, nitro, —COOM, —$SO_3M$ or —$SO_2NR_4R_5$, $R_{23}$ signifies $C_{1-4}$-alkyl, phenyl, —COOM, —$CONR_4R_5$, —$COOCH_3$ or —$COOC_2H_5$, $R_{24}$ signifies =O or =NH, $R_{25}$ signifies hydrogen, unsubstituted amino, phenylamino, sulphonaphthyl, open-chain $C_{1-8}$-alkyl, $C_{6-9}$-cycloalkyl, carboxy-($C_{1-4}$-alkyl), $C_{2-4}$-alkyl substituted with hydroxy, methoxy, ethoxy or a sulpho group in one of the positions β to ω, or a radical of formula (b").

$R_{26}$ signifies hydrogen, nitril, acetyl, —COOM, carbamoyl, —$SO_3M$, pyridinio or 2-methyl-pyridinio, $R_{27}$ signifies hydrogen, hydroxy, methyl, carboxy, phenyl, sulphomethyl or carbamoyl, $R_{28}$ signifies hydroxy, primary amino, nitrilamino, thiol or a radical of formula

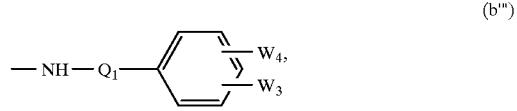
(b''')

$R_{29}$ signifies hydroxy or primary amino, $R_{30}$ signifies hydroxy or primary amino, $R_{31}$ signifies hydrogen, methyl, chlorine, chloromethyl or chloroacetyl, L signifies —O—, —NH— or the direct bond, $R_{32}$ signifies naphthyl, sulphonaphthyl, disulphonaphthyl or a radical of formula (b"), $R_{33}$ signifies $C_{1-4}$-alkyl, $W_3$ signifies hydrogen, hydroxy, $C_{1-4}$-alkoxy, —NHAc, —$NH_2$, di-($C_{1-4}$alkyl)-amino or carboxymethylamino and $W_4$ signifies hydrogen or methyl, and, where in formula ($b_4$) $R_{26}$ stands for pyridinio or orthomethylpyridinio, any carboxy or sulpho group present in ib molecule may be in the form of the anion —$SO_3^-$ or —$COO^-$ to form the counterion in the form of the inner salt.

28. A process according to claim 27 wherein the sulphur dye (S) is a dye ($S_1$) which has at least one diazotizable amino group and which has been modified by reaction of at least one thiol or hydroxy group of the dye ($S_1$) with a reactant (E) or it is a dye ($S_2$) which has been modified by reaction of an amino group or at least thiol or hydroxy group of the dye ($S_2$) with a reactant (E), wherein said reactant (E) is a reactant ($E_1$) of the formula Hal-alkylene-$Q_2$OM (e1)

Hal—$G_1$—($SO_3M$)$_{m1}$ (e2)

Hal—$CH_2$—$C_6H_5$—$SO_3M$ (e3)

Hal—$CH_2$—CHOH—$CH_2$—$SO_3M$ (e4)

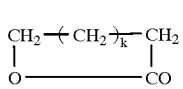
(e5)

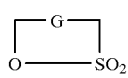
(e6)

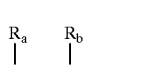
(e7)

$H_2N$—$G_2$—($SO_3M$)$_{m1}$ (e8)

$H_2N$—$G_3$—COOM (e9)

-continued

Hal—E     (e₁₁)

H₂N—G₁—(SO₂NR^{iv}R^v)_{m2}     (e₁₂)

H₂N—G₁—CO—NR^{iv}R^v     (e₁₃)

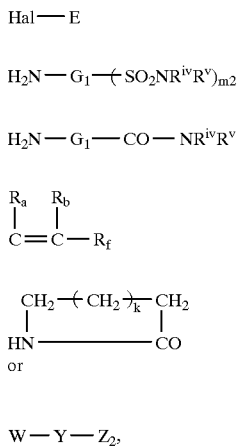     (e₁₄)

W—Y—Z₂,     (III)

wherein
Hal signifies halogen,
$Q_2$ signifies —CO— or —SO₂—,
"alkylene" in formula (e₁) is a $C_{1-3}$-alkylene bridge,
G signifies butylene-1,3 or -1,4, naphthylene-1,8 or tolylene-α, 2,
$G_1$ signifies an optionally further substituted benzene radical,
$G_2$ signifies an optionally further substituted benzene or naphthalene radical,
$G_3$ signifies an optionally further substituted benzene radical,
m1 signifies 1 or 2,
k signifies 1 to 3,
$R_a$ signifies hydrogen, methyl or —COOM,
$R_b$ signifies hydrogen or, if $R_a$ signifies hydrogen, also methyl,
M signifies hydrogen or an alkali metal cation,
E signifies $C_{1-4}$-alkyl, benzyl, —($C_{1-4}$-alkylene)—$Q_2$—NR^{iv}R^v, —CH₂—CHOH—CH₂—$Q_2$—NR^{iv}R^v, —G₁—(SO₂—NR^{iv}R^v)_{m2}

$R^{iv}$ signifies hydrogen, $C_{1-4}$-alkyl or phenyl,
$R^v$ signifies hydrogen or $C_{1-4}$-alkyl,
m2 signifies 0, 1 or 2,
$R_f$ signifies —CONR^{iv}R^v,
W signifies a leaving group or atom,
Y signifies an aliphatic or araliphatic bridging group and
Z signifies a primary, secondary or tertiary amino group of basic character or its protonated derivative or a quaternary ammonium group or an optionally quaternized oligamine radical.

29. An azo dye (Z) obtainable by the process of claim 28.

30. A process according to claim 6 which comprises producing an azo dye (Z) containing at least one azo group and at least one chromophoric radical wherein at least one chromophoric radical comprises a radical of an optionally modified, optionally (pre)reduced sulphur dye (S) or mixture thereof, by a) coupling the diazonium compound of at least one optionally modified, optionally (pre)reduced sulphur dye ($S_1$), optionally over at least one middle component (Mk), to at least one coupling component (B) and further modifying the resulting product by reacting it with a reactant (E), or b) reacting at least one azo group-containing diazonium compound (Dz) with at least one optionally modified, optionally (pre)reduced sulphur dye ($S_2$) and further modifying the resulting product by reacting it with a reactant (E), wherein said reactant (E) is a reactant ($E_1$) providing substituents which do not contain any azo groups and are of anionic, cationic, basic or non-ionic character or a reactant ($E_2$) which is suitable for modifying said resulting product.

31. A process according to claim 30 wherein the reactant ($E_1$) is as defined in claim 28 and reactant ($E_2$) is a complex-forming metal compound, a reducing agent or an oxidizing agent.

32. An azo dye (Z) obtainable by the process of claim 30.

33. A process according to claim 30 wherein the reactant ($E_1$) is selected from the group consisting of i) reactants ($E_{11}$) providing anionic substituents and selected from the group consisting of
a) compounds of formula W—Y—(Z₁)_m     (II)

in which
W signifies a reactive substituent,
Y signifies an aromatic, araliphatic or aliphatic bridging group,
$Z_1$ signifies —COOM or —SO₃M,
m signifies the number of substituents $Z_1$ linked to each group Y and is at least
and M signifies hydrogen or an alkali metal cation, and functional derivatives thereof,
b) a combination of a low molecular aliphatic aldehyde and alkali metal sulphite or bisulphite or $SO_2$ in the presence of alkali metal hydroxide and
c) ethylenically unsaturated carboxylic or sulphonic acids or their salts, ii) reactants ($E_{12}$) which provide non-ionic substituents and are of the formula W—E     (e₁₀)

in which
W is as defined above and
E signifies a non-ionic substituent,
and iii) reactants ($E_{13}$) which provide basic or cationic substituents and are of the formula

W—Y—Z₂ (III)

in which
W and Y are as defined above and
$Z_2$ signifies a primary, secondary or tertiary group of basic character or its protonated derivative or a quaternary ammonium group or an optionally quaterttzed oligamine radical
and the reactant ($E_2$) is a complex-forming metal compound, a reducing agent or an oxidizing agent.

34. An azo dye (Z) obtainable by the process of claim 33.

35. A process according to claim 6 wherein the sulphur dye (S) is a dye ($S_1$) which has at least one diazotizable amino group and which has been modified by reaction of at least one thiol or hydroxy group of the dye (S₁) with a reactant (E) or it is a dye (S₂) which has been modified by reaction of an amino group or at least one thiol or hydroxy group of the dye (S₂) with a reactant (E) and wherein said reactant (E) is selected from the group consisting of reactants (E₁) providing substituents which do not contain any azo groups and are of anionic, cationic or non-ionic character.

36. An azo dye (Z) obtainable by the process of claim 35.

37. A process according to claim 35 wherein the reactant (E) is selected from the group consisting of
  i) reactants (E₁₁) providing anionic substituents and selected from the group consisting of
    a) compounds of formula

W—Y—(Z₁)ₘ  (II)

in which
    W signifies a reactive substituent,
    Y signifies an aromatic, araliphatic or aliphatic bridging group,
    Z₁ signifies —COOM or —SO₃M,
    m signifies the number of substituent Z₁ linked to each group Y and is at least 1
    and M signifies hydrogen or an alkali metal cation, and functional derivatives thereof,
    b) a combination of a low molecular aliphatic aldehyde and alkali metal sulphite or bisulphite or SO₂ in the presence of alkali metal hydroxide and
    c) ethylenically unsaturated carboxylic or sulphonic acids or their salts,
  ii) reactants (E₁₂) which provide non-ionic substituents and are of the formula W—E  (e₁₀)

in which
    W is as defined above and
    E signifies a non-ionic substituent,
  and iii) reactants (E₁₃) which provide basic or cationic substituents and are of the formula

W—Y—Z₂  (III)

in which
    W and Y are as defined above and
    Z₂ signifies a primary, secondary or tertiary group of basic character or its protonated derivative or a quaternary ammonium group or an optionally quaternized oligamine radical.

38. An azo dye (Z), or mixture thereof, obtainable by reacting at least one azo group-containing diazonium compound (Dz) with at least one optionally modified, optionally (pre)reduced sulphur dye (S₂) according to the process of claim 10.

39. A process according to claim 12, wherein watersoluble dyes (Z) are employed for the dyeing of substrates dyeable with watersoluble dyes.

40. An azo dye (Z) obtainable by the process of claim 19.

41. A process which comprises diazotizing an optionally modified, optionally (pre)reduced sulphur dye which contains at least one aromatically linked —NH₂ group to form a diazo compound and coupling said diazo compound to a compound capable of a coupling reaction.

* * * * *